(12) United States Patent
Chao et al.

(10) Patent No.: US 7,003,168 B1
(45) Date of Patent: Feb. 21, 2006

(54) IMAGE COMPRESSION AND DECOMPRESSION BASED ON AN INTEGER WAVELET TRANSFORM USING A LIFTING SCHEME AND A CORRECTION METHOD

(75) Inventors: Hongyang Chao, Denton, TX (US); Howard P. Fisher, Denton, TX (US); Paul S. Fisher, Denton, TX (US); Zeyi Hua, Denton, TX (US)

(73) Assignee: Vianet Technologies, Inc., Plano, TX (US)

( * ) Notice: Subject to any disclaimer, the term of this patent is extended or adjusted under 35 U.S.C. 154(b) by 0 days.

(21) Appl. No.: 09/038,562

(22) Filed: Mar. 11, 1998

Related U.S. Application Data

(60) Provisional application No. 60/040,241, filed on Mar. 11, 1997.

(51) Int. Cl.
*G06K 9/36* (2006.01)
(52) U.S. Cl. .................................. 382/240; 348/408.1
(58) Field of Classification Search ................ 382/232, 382/238, 239, 240, 244, 245, 246, 247, 248, 382/251; 348/394, 395, 397, 398, 404, 405, 348/408, 419, 425, 437, 438, 394.1, 395.1, 348/397.1, 398.1, 404.1, 405.1, 408.1, 419.1, 348/425.1, 437.1, 438.1; 345/430, 582; 358/261.1, 261.2, 261.3, 427, 430, 426.01; 341/51, 79
See application file for complete search history.

(56) References Cited

U.S. PATENT DOCUMENTS

| | | | |
|---|---|---|---|
| 4,974,187 A | * | 11/1990 | Lawton ..................... 708/420 |
| 5,014,134 A | | 5/1991 | Lawton et al. ............ 358/261.3 |
| 5,101,446 A | | 3/1992 | Resnikoff et al. ............. 382/56 |
| 5,241,395 A | | 8/1993 | Chen ........................ 358/261.3 |
| 5,412,741 A | | 5/1995 | Shapiro ....................... 382/232 |
| 5,414,780 A | | 5/1995 | Carnahan ..................... 382/276 |
| 5,420,636 A | | 5/1995 | Kojima ........................ 348/403 |
| 5,453,945 A | | 9/1995 | Tucker et al. ................ 364/725 |
| 5,495,292 A | | 2/1996 | Zhang et al. ................ 348/407 |
| 5,586,200 A | | 12/1996 | Devaney et al. ............ 382/232 |
| 5,600,373 A | | 2/1997 | Chui et al. ................... 348/397 |
| 5,604,824 A | * | 2/1997 | Chui et al. ................... 382/248 |
| 5,615,287 A | | 3/1997 | Fu et al. ..................... 382/232 |
| 5,640,159 A | | 6/1997 | Furlan et al. ................. 341/51 |
| 5,668,897 A | | 9/1997 | Stolfo ......................... 382/283 |
| 5,682,152 A | | 10/1997 | Wang et al. .................. 341/50 |

(Continued)

OTHER PUBLICATIONS

Chao et al., An Approach to Integer Reversible Wavelet Transformations for Lossless Image Compression, Apr. 2000, p. 1-18.*

(Continued)

*Primary Examiner*—Yon J. Couso
(74) *Attorney, Agent, or Firm*—Ostrolenk, Faber, Gerb & Soffen, LLP

(57) ABSTRACT

A wavelet-based image compression system and method are presented. Compression is accomplished by performing a wavelet transformation of an input digital image. The resulting wavelet coefficients are compared to a threshold value. Coefficients falling below the threshold are discarded. The remaining coefficients are quantized. The quantized coefficients are then compressed using an entropy encoding technique, such as arithmetic, run length, or Huffman encoding, or a combination of Huffman and run length encoding. The wavelet transform can be an integer wavelet transform derived using a lifting scheme or correction method, while the quantization scheme can be sub-band oriented. Input color image pixels can be reduced using a color table. In addition, color pixels can be transformed between color spaces prior to wavelet transformation.

6 Claims, 6 Drawing Sheets

U.S. PATENT DOCUMENTS

| | | | |
|---|---|---|---|
| 5,703,965 A | 12/1997 | Fu et al. | 382/232 |
| 5,748,786 A | 5/1998 | Zandi et al. | 382/240 |
| 5,754,793 A | 5/1998 | Eom et al. | 395/200.77 |
| 5,757,974 A | 5/1998 | Impagliazzo et al. | 382/248 |
| 5,764,805 A | 6/1998 | Martucci et al. | 382/238 |
| 5,828,849 A | 10/1998 | Lempel et al. | 395/200.77 |
| 5,831,625 A * | 11/1998 | Rich et al. | 345/430 |
| 5,881,176 A | 3/1999 | Keith et al. | 382/248 |
| 5,901,249 A | 5/1999 | Ito | 382/239 |
| 5,923,785 A | 7/1999 | Dube | 382/240 |
| 6,779,073 B1 * | 8/2004 | McLaughlin et al. | 711/100 |

OTHER PUBLICATIONS

Munteanu et al., Wavelet Lossless Compression of Coronary Angiographic Images, Sep. 1997, p. 183-186., Computers in Cardiology 1997.*

Calderbank et al., Lossless Image Compression using Integer to Integer Wavelet Transforms, Oct. 1997, p. 596-599, Image Processing, 1997. Proceedings., International Conference on.*

Said et al., An Image Multiresolution Representation for Lossless and Lossy Compression, Sep. 1996, p. 1303-1310, Image Processing, IEEE Transactions on.*

Calderbank et al., Wavelet Transforms that Map Integers to Integers, Aug. 1996, p. 1-39.*

* cited by examiner

IMAGE COMPRESSION AND DECOMPRESSION BASED ON AN INTEGER WAVELET TRANSFORM USING A LIFTING SCHEME AND A CORRECTION METHOD

This application claims the benefit of U.S. Provisional Application No. 60/040,241, filed Mar. 11, 1997, System and Method for Still Image Compression, which is incorporated herein by reference.

FIELD OF THE INVENTION

The present invention relates generally to digital image compression/decompression, and particularly, to a wavelet-based system and method of image compression and decompression.

BACKGROUND OF THE INVENTION

Nearly every computer user needs to store, transfer, and view images. These images include still images, or pictures, as well as video images, which are sequences of still images displayed in a manner that depicts motion. The enormous size of image files leads to serious file management limitations. For example, a single still image (equivalent to a video frame) displayed by a rectangular array of picture elements (pixels) arranged in 640 rows and 800 columns, with the color of each pixel represented by twenty-four bits, would require over 1.5 megabytes of digital memory to store. One solution to this problem is high-quality data compression technology. Essentially, image compression mathematically transforms a grid of image pixels into a new, much smaller set of digital values holding the information needed to regenerate the original image or data file.

In addition to imaging systems, compression technology can be incorporated into "video on demand" systems, such as video servers. Compression technology can also be applied to streaming video, which is the real-time capture and display of video images over a communications link. Applications for streaming video include video telephones, remote security systems, and other types of monitoring systems.

Several standards for compressing real-time video currently exist. The H.263 standard for real-time video is an industry standard based upon the discrete co-sign transform (DCT). DCT is also the basis for both of the public domain image compression standards, MPEG (Motion Picture Experts Group) and JPEG (Joint Photographic Experts Group). Although the DCT approach performs interframe coding adequately, its compression ratio and speed can be improved upon.

Various other types of data compression have been developed in recent years. Conventional data compression techniques are generally referred to as being either "lossless" or "lossy", depending upon whether data is discarded in the compression process. Examples of conventional lossless compression techniques include Huffman encoding, arithmetic encoding, and Fano-Shannon encoding. With a lossless compression, the decompression process will reproduce all bits of the original image. Lossless compression is important for images found in such applications as medical and space science. In such situations, the designer of the compression algorithm must be very careful to avoid discarding any information that may be required or even useful at some later point.

Lossy compression, in contrast, provides greater efficiency over lossless compression in terms of speed and storage, as some data is discarded. As a result, lossy techniques are employed where some degree of inaccuracy relative to the input data is tolerable. Accordingly, lossy compression is frequently used in video or commercial image processing. Two popular lossy image compression standards are the MPEG and JPEG compression methods.

The wavelet transform has proven to be one of the most powerful tools in the field of data compression. Theoretically, the wavelet transformation is lossless, but since all computers have only finite precision even when using floating point calculations, most of the transformations are lossy in practice. On the other hand, integer calculations are much faster than floating point for virtually all computers; and integer computations are much easier to implement in hardware, which is more important in some applications. While integers require less memory than real numbers, the direct use of integers in conventional wavelet transforms and their inverses typically causes an unacceptable loss of accuracy. Accordingly, there is a need for a wavelet-based compression technique that permits lossless or near-lossless data compression, yet retains the speed and memory advantages of integer arithmetic.

SUMMARY OF THE INVENTION

It is an advantage of the present invention to provide a system and method of wavelet-based data compression that permits integer computations in a computer without significant loss of accuracy. This is accomplished by using an integer reversible wavelet transform that possesses a property of precision preservation (PPP). The integer reversible transform greatly reduces the computer resources needed to compress and decompress images, as well as the time required to perform the same.

It is an advantage of the present invention to provide a system and method of wavelet-based image compression that is suitable for both still and video images.

It is also an advantage of the present invention to provide a system and method of image compression that is capable of selectively performing lossless and lossy compression of either color or gray-scale images.

According to one aspect of the invention, a wavelet-based image compression method can be implemented using a software program. Compression is accomplished by performing a wavelet transform on an input digital image. The resulting wavelet components are compared to a threshold value; coefficients falling below the threshold are discarded. The remaining coefficients are quantized. The quantized coefficients are then compressed using an entropy encoding technique, such as arithmetic, run length, or Huffman encoding, or a combination of Huffman and run length encoding. The wavelet transform can be an integer reversible wavelet transform derived using a lifting scheme or correction method, while the quantization scheme can be sub-band oriented. To further enhance the speed of the compression scheme, input color image pixels can be reduced using a color table. In addition, color pixels can be transformed between color spaces prior to wavelet transformation.

According to another aspect of the invention, a corresponding method of decompression is provided.

According to another aspect of the present invention, a compression method is provided that allows user selected portions of an image to be compressed to different image qualities, thereby permitting non-uniform image compression.

According to another aspect of the present invention, a compression method is provided that permits compression quality to be based on image specific parameters.

According to another aspect of the present invention, a method of compressing images using a "split and merge" technique is provided.

According to further aspect of the present invention, an image compression system includes a compressor configured to generate a compressed image based on an integer wavelet transform derived using either a lifting scheme or correction method. The compressor can be implemented using one or more electronic components, such as application specific integrated circuits (ASICs), microprocessors, discrete logic components, or any combination of the aforementioned.

According to another aspect of the present invention, a corresponding image decompression system is provided.

BRIEF DESCRIPTION OF THE DRAWINGS

The invention is pointed out with particularity in the appended claims. However, other features of the invention will become more apparent, and the invention will be best understood by referring to the following detailed description in conjunction with the accompanying drawings, in which:

DETAILED DESCRIPTION OF THE PREFERRED EMBODIMENTS

Figure 1:
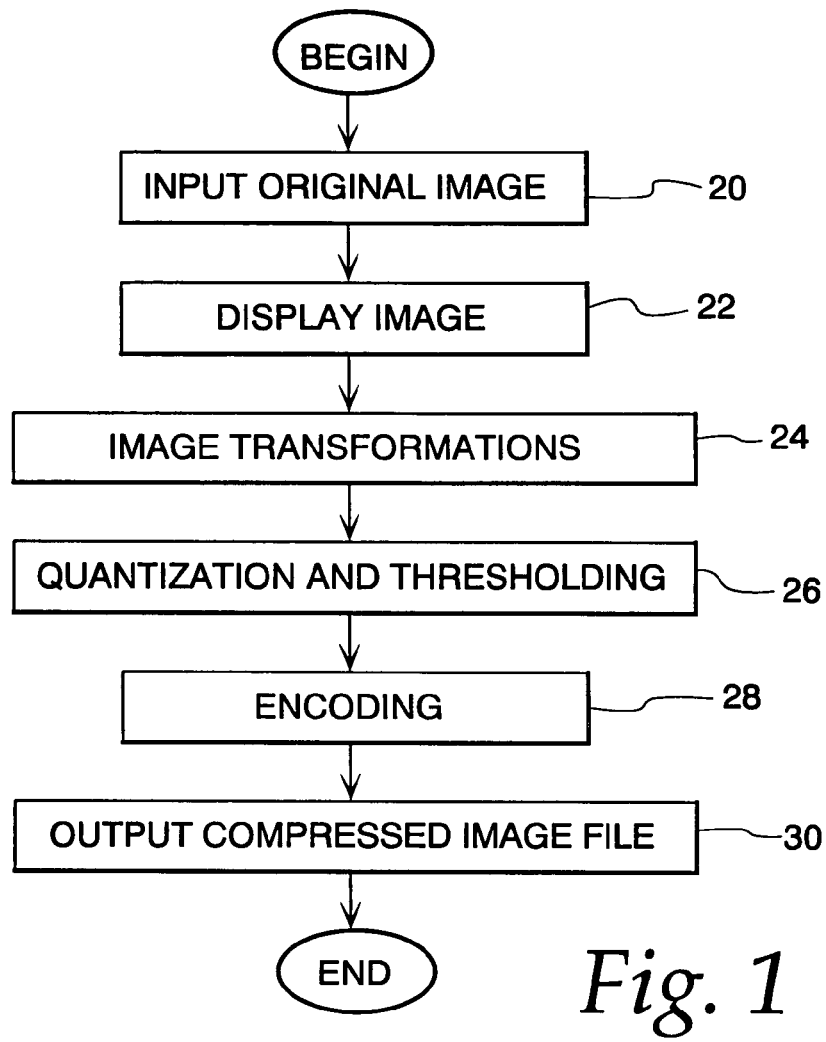
FIG. 1 illustrates a flow diagram for a method of compressing an image that is in accordance with an embodiment of the present invention.

Referring now to the drawings, and in particular to FIG. 1, there is shown a flow diagram of a method for compressing an image that conforms to a first embodiment of the invention. In step 20, a digital image is received from an image source. The digital image consists of a matrix of values representing an array of pixels. Specifically, the array of pixels represents a still image or a frame from a video image. In step 22, the image is optionally displayed on an appropriate viewing device, such as a computer or video display unit having a flat panel or cathode ray tube (CRT). Next, in step 24, color and wavelet transformations of the image take place. The image transformations involved in this step include color transform for color images only, and wavelet transform for both gray level images and color images. In step 26, the values representing the transformed images are quantized and compared to thresholds. Values falling outside the threshold are discarded. In step 28, the remaining quantized values are encoded to remove redundant information, creating a compressed image file. Next, in step 30 the compressed image file is generated as output.

Referring to the color transformation of step 24, digital color images are typically based on an RGB color model, such as is commonly used with TIFF or BMP images. In order to get a higher compression ratio, the RGB pixels are transformed to other color models, such as YIQ or YUV models. The method can convert RGB inputs into YIQ or YUV color spaces according to the following relationships.

RGB to YIQ:

$$\begin{bmatrix} Y \\ I \\ Q \end{bmatrix} = \begin{bmatrix} 0.299 & 0.587 & 0.114 \\ -0.596 & -0.275 & 0.321 \\ 0.212 & -0.523 & 0.311 \end{bmatrix} \begin{bmatrix} R \\ G \\ B \end{bmatrix}$$

RBG to YUV:

$$\begin{bmatrix} Y \\ U \\ V \end{bmatrix} = \begin{bmatrix} 0.299 & 0.587 & 0.114 \\ 0.148 & -0.289 & 0.439 \\ 0.615 & -0.515 & -0.1 \end{bmatrix} \begin{bmatrix} R \\ G \\ B \end{bmatrix}$$

In the YIQ color space, there is one luminescence (Y) and two color planes (I, Q). The Y component is critical, while the I-Q components are less sensitive to error introduced by data compression.

The wavelet transform (also referred to as wavelet decomposition) operates on the converted color space signals. The purpose of the wavelet transform is to represent the original image by a different basis to achieve the objective of decorrelation. There are many different wavelet transforms that can be used in this step. For instance, the reversible integer wavelet transform described herein below is a preferred wavelet transform. However, to develop a better understanding of the preferred transform, the following alternative wavelet transform is first described.

Figure 2:
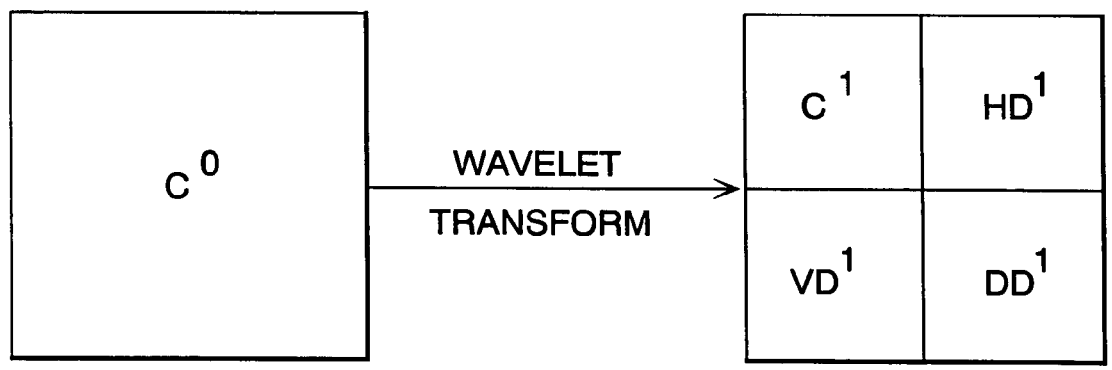
FIGS. 2–4 depict wavelet coefficients for various levels of decomposition.

Let $C^0 = [C_{jk}^0]$ (j=0, ..., M−1; k=0, ...,

N−1) represent the original, uncompressed image, where M and N are integers which have the common factor $2^L$ (L is a positive integer). A one-level wavelet decomposition, where L=1, results in the four coefficient quadrants as shown in FIG. 2. Each quadrant represents a set of wavelet coefficients.

Quadrant $C^1$ represents the blurred image of the original image $C^0$, where $$C^1 = [C^1_{jk}]\left(j=0,\ldots,\frac{M}{2}-1; k=0,\ldots,\frac{N}{2}-1\right).$$

$HD^1$ represents the horizontal high frequency part of $C^0$, while $VD^1$ represents the vertical high frequency part of $C^0$, and $DD^1$ represents the diagonal high frequency part of $C^0$. The decomposition can be iteratively repeated L times to obtain different levels of decomposition. For example, for L=2, $C^0$ is set to equal $C^1$. The iterative formula for computing a decomposition is given as follows:

(1) Let $\overline{C}^0 = rC^0$, r>0 is a factor which can be changed for different needs.

(2) Transform for image columns:
For k=0, ..., N−1, calculate $$\begin{cases} \tilde{d}^1_{0k} = \dfrac{\overline{C}^0_{1k} - \overline{C}^0_{0K}}{2}, \\ \tilde{d}^1_{jk} = \dfrac{1}{4}(\overline{C}^0_{2j-1,k} - 2\overline{C}^0_{2j,k} + \overline{C}^0_{2j+1,k}), j=1,\ldots,\dfrac{M}{2}-1. \end{cases} \quad (3.1.1)$$

For k=0 ..., N−1, calculate $$\begin{cases} \tilde{C}^1_{0k} = \overline{C}^0_{1,k} - \dfrac{\tilde{d}_{ok} + \tilde{d}_{1,k}}{2}, \\ \tilde{C}^1_{jk} = \overline{C}^0_{2j+1,k} - \dfrac{\tilde{d}^1_{jk} + \tilde{d}_{j+1,k}}{2}, j=1,\ldots,\dfrac{M}{2}, \\ \tilde{C}^1_{\frac{N-2}{2}}, k = \tilde{C}^0_{N-1,k} - \dfrac{\tilde{d}_{N-2}}{2}, k. \end{cases} \quad (3.1.2)$$

(3) Transform for rows:
For j=0, ... M/2−1, computing $$\begin{cases} hd^1_{j,0} = \dfrac{\tilde{c}_{j1} - \tilde{c}_{j0}}{2}, \\ hd^1_{jk} = \dfrac{1}{4}(\tilde{c}^1_{j,2k-1} - 2\tilde{c}_{j,2k+1} + \tilde{c}_{j,2k+1}), k=1\ldots\dfrac{N}{2}-1. \end{cases} \quad (3.1.3)$$

and $$\begin{cases} c^1_{j0} = \tilde{c}^1_{j,1} - \dfrac{hd^1_{j0} + hd^1_{j1}}{2}, \\ c^1_{jk} = \tilde{c}^1_{j,2k+1} - \dfrac{hd^1_{j,k} + hd^1_{j,k+1}}{2}, \ldots, \dfrac{M}{2}-2, \\ c_{j,\frac{N-2}{2}} = \tilde{c}^1_{j,N-1} hd_{j,\frac{N-2}{2}}, \end{cases} \quad (3.1.4)$$

For j=0, ..., M/2−1, computing $$\begin{cases} dd^1_{j,0} = \dfrac{\tilde{d}^1_{j,1} - \tilde{d}^1_{j0}}{2}, \\ dd^1_{jk} = \dfrac{1}{4}(\tilde{d}^1_{j,2k-1} - 2\tilde{d}^1_{j,2k} + \tilde{d}^1_{j,2k+1}), k=1\ldots\dfrac{N}{2}-1. \end{cases} \quad (3.1.5)$$

and $$\begin{cases} vd^1_{j0} = \tilde{d}^1_{j,1} - \dfrac{dd^1_{j0} + dd^1_{j1}}{2}, \\ vd^1_{jk} = \tilde{d}^1_{j,2k+1} - \dfrac{dd^1_{j,k} - dd^1_{j,k+1}}{2}, k=1,\ldots,\dfrac{M}{2}-2, \\ vd_{j,\frac{N-2}{2}} = \tilde{d}_{N-1,k} - dd^1_{j,\frac{N-2}{2}}, \end{cases} \quad (3.1.6)$$

(4) $C^1 = [c^1_{j,k}]$, $HD^1 = [hd^1_{j,k}]$, $VD^1[vd^1_{j,k}]$ and $DD = [dd^1_{j,k}]$, j=0, ..., $$\frac{M}{2}-1 \ k = 0,\ldots,\frac{M}{2}-1.$$

Remark: If it is necessary, we also can use matrix multiply Wavelet Coefficient Image of 1 levels=$W_1 C^0 W_1^T$. Here, $W^1$ is the transform matrix for 1 level wavelet decomposition.

Figure 3:
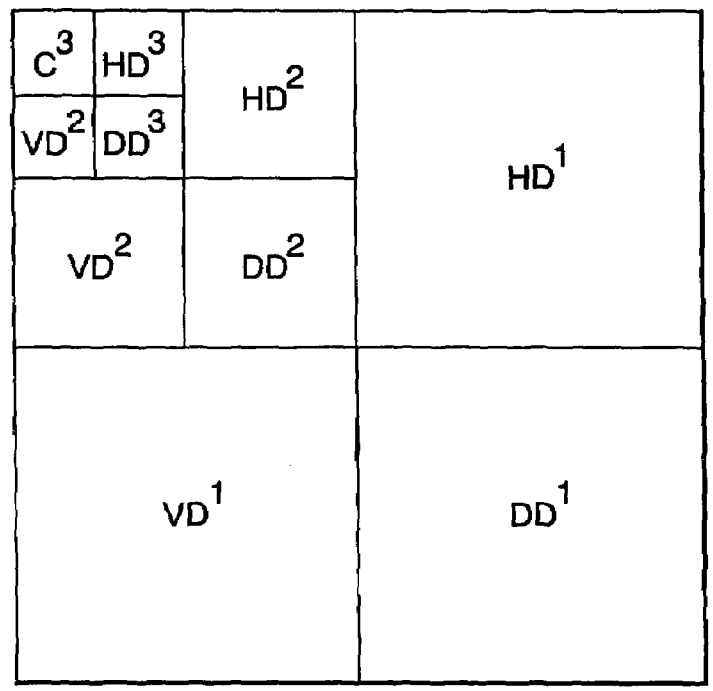

FIG. 3 depicts a three-level wavelet decomposition, where L=3.

In step 26, the first loss in accuracy occurs. Both thresholding and quantization reduce accuracy with which the wavelet coefficients are represented. In step 26, the wavelet coefficients are matched against threshold values, and if the values are less than the established threshold values specified, then the resultant value is set to zero.

An important feature of the invention is that the wavelet coefficients are then quantized to a number of levels depending upon which quadrant is being processed, and the desired compression or quality factor. This can be very important in image compression, as it tends to make many coefficients zeros, especially those for high spatial frequencies, which reduces the size of a compressed image.

A multilevel uniform thresholding method can be used as described below.

Let $T = (t_1,\ldots,t_L, t_{L+1})$ be the chosen thresholds, where $t_l$ is the threshold for l the (l=I, L) level and $t_{L+1}$ is a threshold for blurred image $C^L$. Thresholding sets every entry in the blocks $C^L$, $HD^1$, $VD^1$ and $DD^1$ (l=I, ... L) to be zero if its absolute value is not greater than the corresponding threshold.

For color images, three threshold vectors which correspond three different color planes, such as y, I and Q, are used.

The step of quantization essentially scales the wavelet coefficients and truncates them to a predetermined set of integer values. The quantization table shown in Table 1 can be used.

TABLE 1

| $q^1_{HD}$ | $q^2_{HD}$ | $\cdots$ | $q^L_{HD}$ | |
| $q^1_{VD}$ | $q^2_{VD}$ | $\cdots$ | $q^L_{VD}$ | |
| | | | | $q_c^{L+1}$ |
| $q^1_{DD}$ | $q^2_{DD}$ | $\cdots$ | $q^L_{DD}$ | |

In Table 1, the entries $q^1_{HD}$ are quantization factors for blocks $HD^1$ (l=I, ... L), $q^1_{VD}$ and $q^1_{DD}$ for blocks $VD^1$ and $DD^1$ (l=I, ..., L) respectively, and the factor $q_c^{L+1}$ is for the most blurred image $C^L$. The factors can be integers between 0 and 255. The quantization scheme for the block $HD^1$ (l=I, ..., L) is $$\overline{hd}_{j,k}^l = \text{round} \frac{hd_{j,k}^l \cdot q_{HD}^l}{\max_{HD}^l}, j = 0, \ldots, \frac{M}{2^l} - 1; k = 0, \ldots, \frac{N}{2^l} - 1. \quad (3.2.1)$$

Here, $$\overline{hd}_{j,k}^l \left( j = 0, \ldots, \frac{M}{2^l} - 1; k = 0, \ldots, \frac{N}{2^l} - 1 \right)$$

are quantized wavelet coefficients of block $HD^l (l=1, \ldots, L)$ $\max_{HD}{}^l = \max(|hd_{j,k}{}^l|)$, $0 \leq j \leq (M/2^1/2^1 - 1)$ $0 \leq j \leq (N/2^1/2^1 - 1)$ and the function round(x) gives the nearest integer of x. Equation (3.2.1) is used for quantization of the other blocks (quadrants).

For color images, there are three separate quantization tables for the different color bands.

In step 28, entropy compression is applied to the resultant coefficients using either Arithmetic, Run Length, or Huffman, or Huffman and Run Length combined. The compression algorithm can be selected at run-time by the user, based on the desired compression ratio and the amount of time required to get the selected level of compression. The encoding step includes the entropy compression as well as coefficient rearranging.

An alternative process to that shown in FIG. 1 includes an optional down sampling of the IQ color planes. This down sampling may be done once or twice to produce two image planes either one-fourth or one-sixteenth the size of the original plane. If the down sampling is done, it will be accomplished prior to the wavelet transform of step 24. The down sampling reduces the compression time and size of the image file.

Figure 5:
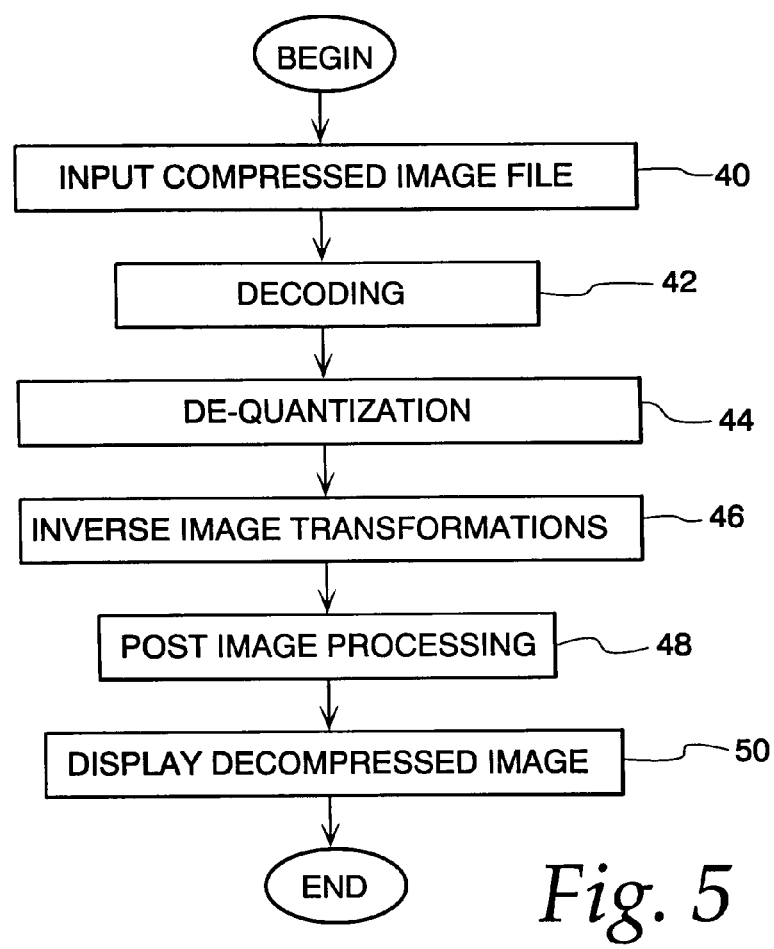
FIG. 5 illustrates a flow diagram of a method of decompressing an image that has been compressed using the method of FIG. 1.

FIG. 5 shows a corresponding method for decompressing an image compressed using the method of FIG. 1. In step 40, the compressed image file is input. In step 42, the image is decoded. Next, in step 44 the values are de-quantized. Next, in step 46 inverse color and wavelet transformations are performed on the de-quantized data. In step 48, optional image post-processing takes place to refine the decompressed image. In step 50, the decompressed image is displayed.

The decoding of step 42 is the inverse operation of the encoding of step 28. Similarly, it can be divided into two parts: Entropy decoding (Huffman or arithmetic), and coefficient rearranging.

The decoding step produces quantized wavelet coefficients in 3*L+1 blocks. Dequantizing (step 44) uses the same quantization table as quantizing (Table 1), and the scheme as follows: for l=I, . . . , L $$\underline{hd}_{j,k}^l = \frac{\overline{hd}_{j,k}^l \cdot \max_{HD}^l}{q_{HD}^l}, j = 0, \ldots, \frac{M}{2^l} - 1; k = 0, \ldots, \frac{N}{2^l} - 1. \quad (4.2.1)$$

Equation (4.2.1) produces the approximate coefficients for the blocks $HD^l$ (l=I, . . . , L), which are shown in FIG. 3. The dequantizing scheme for other blocks is similar to 4.1.2).

Figure 4:
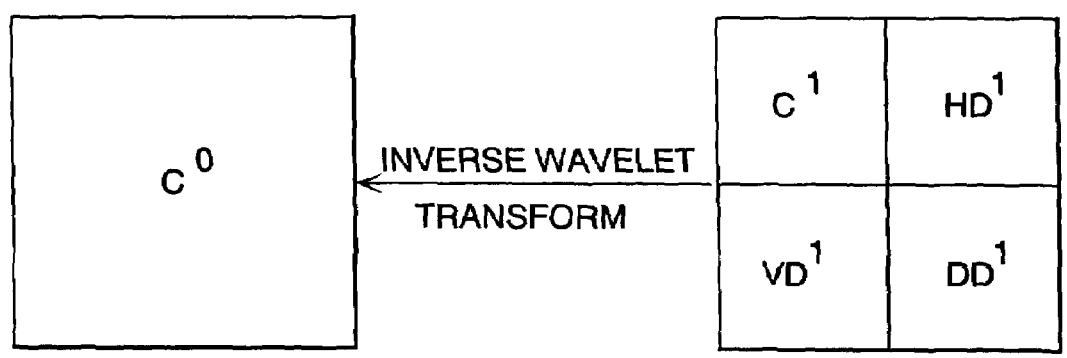

In step 46, the inverse wavelet transform, also referred to as wavelet reconstruction, is performed prior to the inverse color transformation. FIG. 4 depicts a one-level wavelet reconstruction.

The wavelet reconstruction can be iteratively performed for various levels of decomposition, according to the following equations.

(1) Inverse transform for rows:
For $$j = 0, \ldots, \frac{M}{2} - 1,$$

calculate $$\begin{cases} \tilde{d}_{j,1}^1 = v d_{j,0}^1 + \frac{dd_{j,0}^1 + dd_{j,1}^1}{2} \\ \tilde{d}_{j,2k+1}^1 = v d_{jk}^1 + \frac{dd_{j,k}^1 - dd_{j,k+1}^1}{2}, k = 1, \ldots, \frac{N}{2} - 2, \\ \tilde{d}_{N-1,k}^1 = v d_{j,\frac{N-1}{2}}^1 + dd_{j,\frac{N-2}{2}}^1. \end{cases} \quad (4.3.1)$$

and $$\begin{cases} \tilde{d}_{j,0}^1 = d_{j,1}^1 - 2dd_{j,0}^1, \\ \tilde{d}_{j,2k}^1 = \frac{\tilde{d}_{j,2k-1}^1 + \tilde{d}_{j,2k+1}^1}{2} - 2dd_{j,k}^1, k = 1, \ldots, \frac{N}{2} - 1. \end{cases} \quad (4.3.2)$$

For j=0, . . . , M/2−1, calculate $$\begin{cases} \tilde{c}_{j,1}^1 = c_{j0}^1 + \frac{hd_{j0}^1 + hd_{j1}^1}{2} \\ \tilde{c}_{j,2k+1}^1 = c_{jk}^1 + \frac{hd_{j,k}^1 - hd_{j,k+1}^1}{2}, k = 1, \ldots, \frac{N}{2} - 2, \\ \tilde{c}_{j,N-1} = c_{j,\frac{N-2}{2}} + hd_{j,\frac{N-2}{2}}^1. \end{cases} \quad (4.3.3)$$

and $$\begin{cases} \tilde{c}_{j,0}^1 = c_{j,1}^1 - 2hd_{j,0}^1, \\ \tilde{c}_{j,2k}^1 = \frac{1}{2}(\tilde{c}_{j,2k-1}^1 + \tilde{c}_{j,2k+1}^1) - 2hd_{jk}^1, k = 1 \ldots, \frac{N}{2} - 1. \end{cases} \quad (4.3.4)$$

(2) Inverse transform for column:
For k=0, . . . , N−1, calculate
and $$\begin{cases} \tilde{c}_{1,k}^0 = \tilde{c}_{0k}^1 + \frac{\tilde{d}_{0k}^1 + \tilde{d}_{1,k}^1}{2}, \\ \tilde{c}_{2j+1,k}^0 = \tilde{c}_{jk}^1 + \frac{\tilde{d}_{j,k}^1 + \tilde{d}_{j+1,k}^1}{2}, j = 1, \ldots, \frac{M}{2} - 2, \\ \tilde{c}_{N-1,k}^0 = \tilde{c}_{\frac{N-2}{2},k}^1 + \tilde{d}_{\frac{N-2}{2},k}^1. \end{cases} \quad (4.3.5)$$

$$\begin{cases} \bar{c}^0_{0k} = c^0_{1k} - 2\tilde{d}^1_{0k}, \\ \bar{c}^0_{2j,k} = \frac{1}{2}(\bar{c}^0_{2j-1,k} + \bar{c}^0_{2j+1,k}) - 2\tilde{d}^1_{jk}, \ j = 1, \ldots, \frac{M}{2} - 1. \end{cases} \quad (4.3.6)$$

$$c^0_{j,k} = \bar{c}^0_{j,k}/r, \ j = 0, \ldots, M-1; k = 0, \ldots, N-1. \quad (3)$$

$$C^0 = [c^0_{j,k}]\frac{N}{1} \times \frac{N}{2}.$$

Following the inverse wavelet transformation, an inverse color transform is performed. Equations (5)–(6) give the inverse transforms for the YIQ and YUV color spaces.

For YIQ to RGB:

$$\begin{bmatrix} R \\ G \\ B \end{bmatrix} = \begin{bmatrix} 1.000 & 0.956 & 0.621 \\ 1.000 & -0.272 & -0.647 \\ 1.000 & -1.106 & 1.703 \end{bmatrix} \begin{bmatrix} Y \\ I \\ Q \end{bmatrix} \quad (5)$$

For YUV to RGB:

$$\begin{bmatrix} R \\ G \\ B \end{bmatrix} = \begin{bmatrix} 1.000 & 0.000 & 1.140 \\ 1.000 & -0.395 & -0.581 \\ 1.000 & 2.032 & 0.000 \end{bmatrix} \begin{bmatrix} Y \\ U \\ V \end{bmatrix} \quad (6)$$

In step 48, a user can optionally apply image filtering to improve the image quality. Filters are known in the art for sharpening, smoothing and brightening images. Users can choose any number of processing filters at compression time. Information defining the selected filters can be stored in the coded image file, in a form such as a one byte flag in a file header. In addition to optionally applying the filters, the method can also be implemented to automatically detect and apply the selected filters following decompression.

To sharpen an image, a filter is used that weights the eight pixels adjacent to the current pixel, as well as the current pixel, by one or more predetermined values. The weighted values of the nine pixels are then summed to derive a new value for the current pixel. For example, the surrounding eight pixel values can be weighted by the value $-35/800$, while the current pixel is weighted by 1.35. The sharpening filter is applied to every pixel in the image.

To smooth images, for every pixel, the average of the pixel and the eight adjacent pixels is calculated. Then the pixel value and the average is compared. The smaller of the two replaces the original pixel and is output as the smoothed pixel value.

To brighten images, the weighted sum of each pixel and the correspond eight adjacent pixels is calculated. For example, each of the adjacent pixels can be multiplied by the value $1/90$ and the summed with the current pixel to obtain a brighten current pixel.

Another filter that can be used is one that adds a random value between [−12, 12] to each of the pixels in the image.

Figure 6:
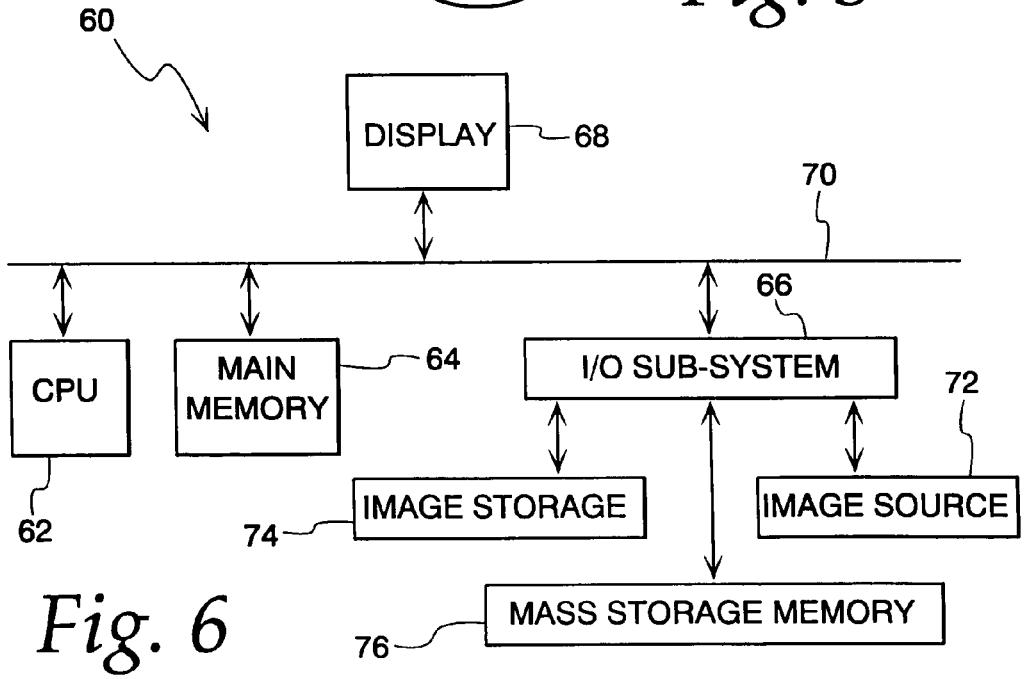
FIG. 6 is a block diagram of a system that can incorporate a software program implementing any of the methods shown in FIGS. 1, 5, and 8–13 in accordance with a second embodiment of the present invention.

In FIG. 6 there is displayed a preferred hardware platform that can execute software for implementing an embodiment of the present invention. The computer system of FIG. 3 includes a CPU 62, a main memory 64, an I/O subsystem 66, and a display 68, all coupled to a CPU bus 70. The I/O subsystem 66 communicates with peripheral devices that include an image source 72, an image storage device 74, and a mass storage memory 76. Although shown as three separate devices, peripherals 72–76 can be implemented using a single memory device, such as a hard disk drive commonly found in computers.

The image source 72 may be a digital still image or video source, such as a CD-ROM drive, scanner, or network connection. In addition, the image source 72 can include analog video sources, such as a video camera, VCR, television broadcast or cable receiver. The analog video signals would be converted to a digital form by the image source 72 using conventional conversion techniques. Alternatively, an image source 72 can include a video camera and communications systems for transmitting real-time video to the I/O subsystem 66.

The image storage 74 can be a computer disk, such as a that used by a hard drive, or a portable memory medium, such as a floppy or ZIP disk, or a read/write optical CD.

In operation, a computer program, which implements aspects of the invention, is retrieved from the mass storage memory 76 into the main memory 64 for execution by the CPU 62. Upon execution of the compression aspect of the invention, the compressed image file can be stored in the image storage 74; while upon execution of the decompression aspect of the invention, the decompressed image can be viewed on the display 68. Operating under the control of the computer program, the CPU 62 can process images according to the methods set forth herein, as shown in FIGS. 1–2 and 6–10.

Figure 7:
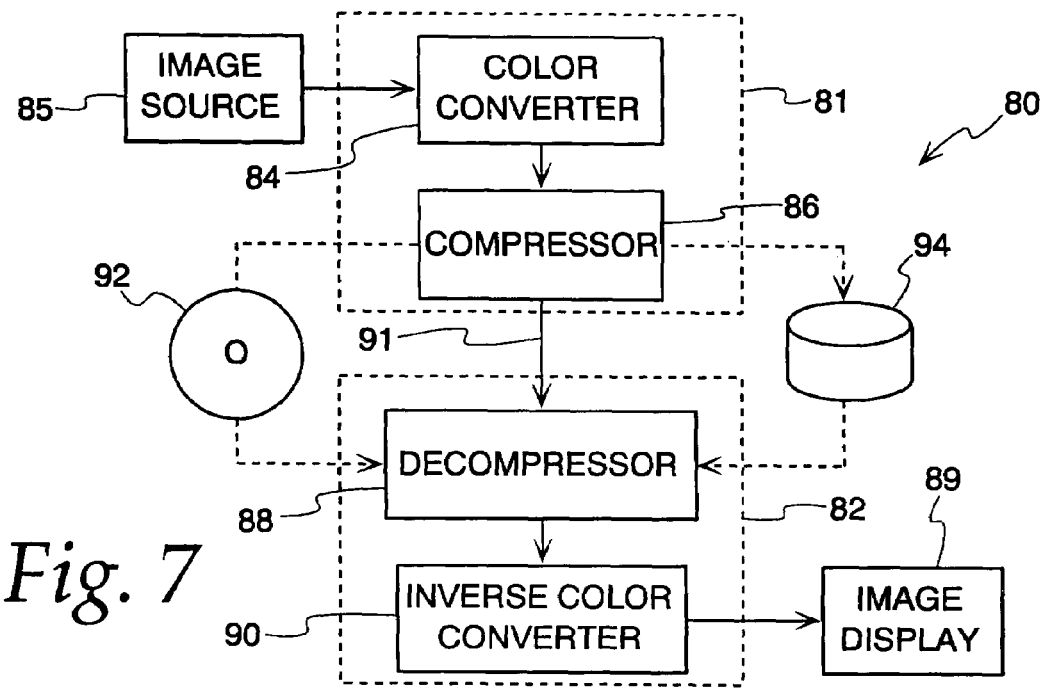
FIG. 7 is a block diagram of a system for compressing and decompressing an image in accordance with another embodiment of the present invention.

FIG. 7 illustrates an alternative hardware platform implementing a system in accordance with a further embodiment of the present invention. System 80 can be implemented using a variety of different hardware components, such as ASIC (Application Specific Integrated Circuits), or a combination of discrete digital components, such as microprocessors, standard logic components, and other programmable logic devices. The system 80 includes a compression system 81 and a decompression system 82. The compression system 81 can be configured to perform any one or combination of the compression methods set forth in FIGS. 1, 8, 10, and 12; while the decompression system can be configured to perform any one or combination of the decompression methods set forth in FIGS. 5, 9, 11, and 13.

An image source 85 provides digital pixel values to a color converter 84. The image source 85 can provide the same functionality as described earlier for the image source 72 of FIG. 6.

The color converter 84 performs a color space transformation on the input pixels, such as any of those described herein for FIG. 1. The converter functionality can be provided by conventional integrated circuits that are readily available from various manufacturers. Compressor 86 compresses the transformed pixels, removing redundant data. The compressed image file generated by the compressor 86 can be transferred directly to the decompression system 82 over a transmission medium 91. The transmission medium 91 can be a radio-link, computer network, cable television network, or satellite link. Alternatively, the compressor 86 can transmit its output to a portable storage medium 92, such as an optical, floppy, or ZIP disk; or to a mass storage device 94 such as a computer hard disk or archival system.

The decompressor 88 expands the compressed image file by applying an inverse wavelet transformation, as well as de-quantization and de-encoding functions. The decompressed data is then passed to an inverse color converter 90 that applies an inverse color space transformation to generate pixel values in a color space and format appropriate for the image display 89. Standard electronic components are readily available for performing the function of the inverse color converter 90.

Figure 8:
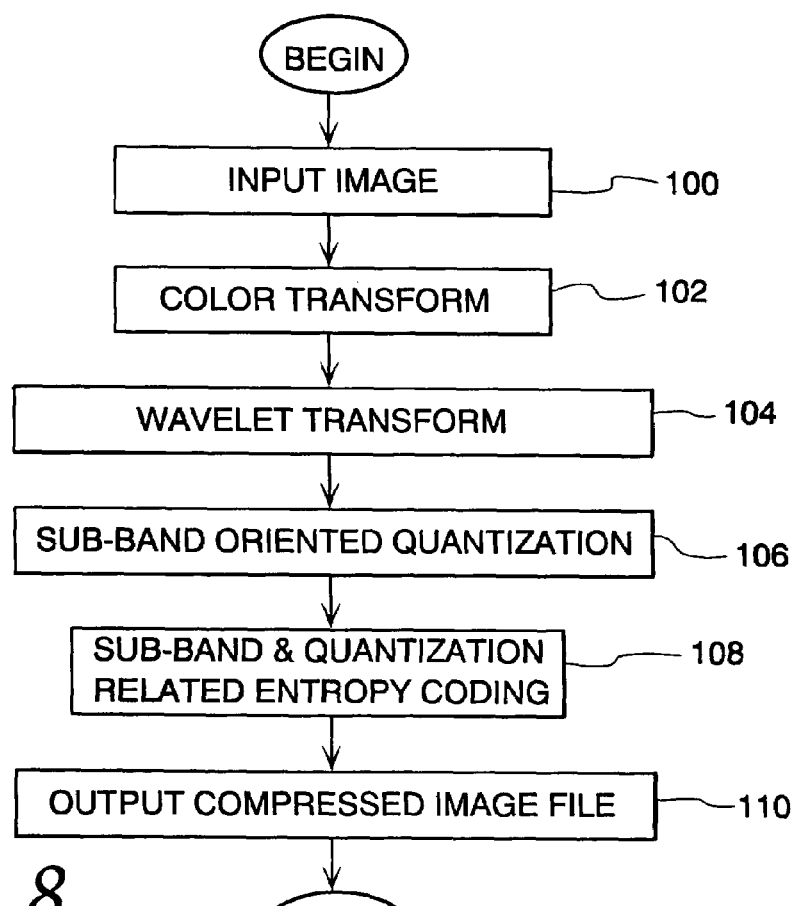
FIG. 8 illustrates a flow diagram of a method compressing an image that is in accordance with a further embodiment of the present invention.

FIG. 8 illustrates a flow diagram of a method of compressing an image in accordance with an alternative embodiment of the present invention. In step 100, a digital image is input. In step 102, a color space transformation is performed on the input image pixels. In step 104, the pixels are subjected to a wavelet transformation. In step 106, sub-band quantization is performed on the wavelet coefficients. Next, in step 108 the quantized sub-bands are respectively entropy encoded. In step 110, the coded image file is output.

Sub-band oriented quantization and entropy coding are well suited for wavelet-based image compression. The main idea is to take the advantage of different quantizations at different sub-bands (wavelet quadrant) and encode each band accordingly. Quadrants having a high variance in wavelet values can be allocated a finer mesh size for quantization, while those quadrants with smaller variances will be assigned fewer levels of quantization. That is, the number of bits one wishes to allocate to the output could be varied by quadrant. Those quadrants with large variances will utilize more bits, while those with low variants will utilize fewer bits. In this way, the number of bits resulting from quantization will remain the same, but their allocation will differ depending upon the nature of the image. This technique greatly improves image quality while maintaining a high compression ratio.

Figure 9:
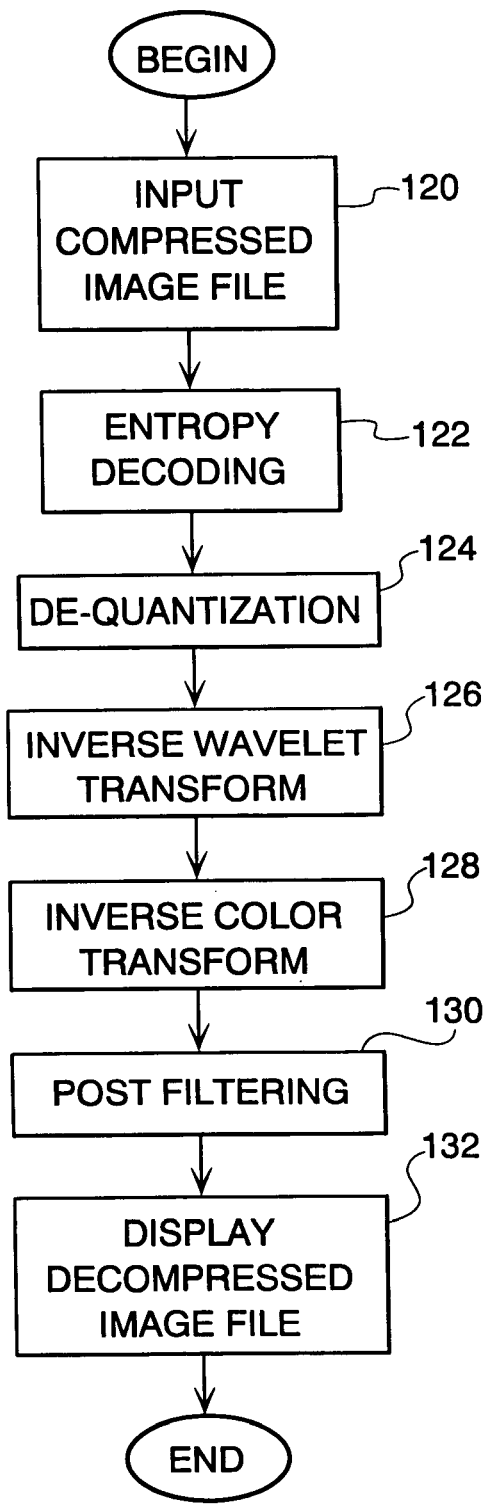
FIG. 9 illustrates a flow diagram of a method for decompressing an image that has been compressed according to the method of FIG. 8.

FIG. 9 illustrates a flow diagram of a method of decompressing an image compressed according to the methods shown in FIG. 8. Step 120, the compressed file is input. In step 122, the input image is entropy decoded. In step 124, de-quantization is performed on the decoded image file. Next, in step 126, an inverse wavelet transform is performed on the image. In step 128, an inverse color transformation is performed. In step 130, post-processing altering is optionally performed. In step 132, the decompressed image file is then displayed.

Figure 10:
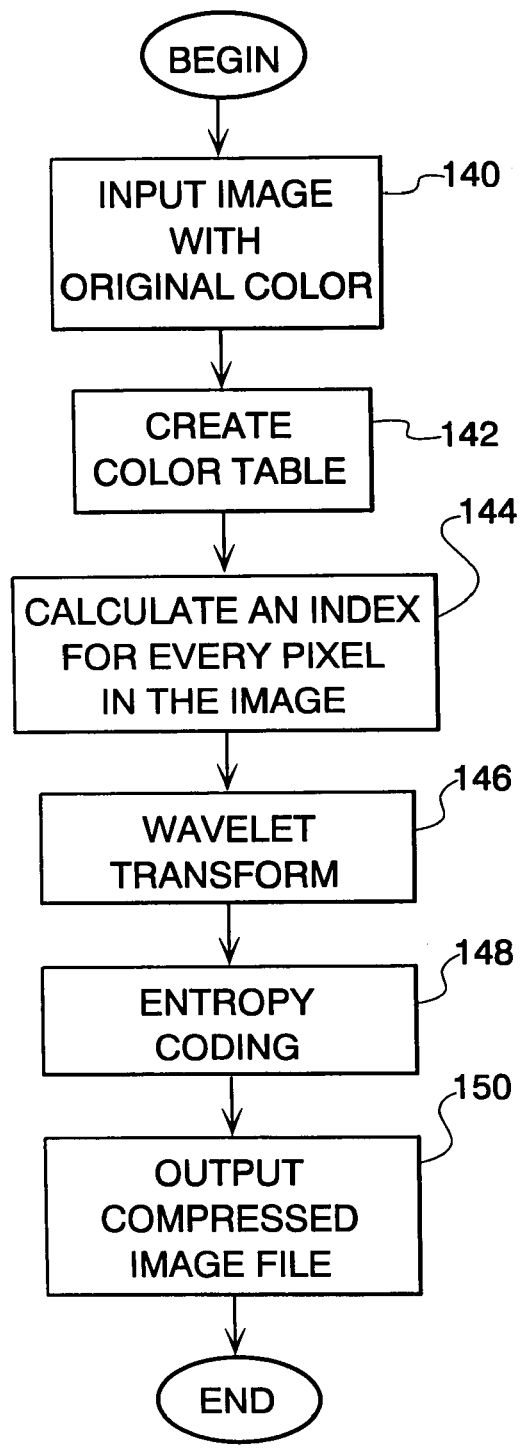
FIG. 10 illustrates a flow diagram of a method of compressing an image in accordance with a further embodiment of the present invention.

FIG. 10 illustrates a flow diagram of a method of compressing an image in accordance with another embodiment of the present invention. This method performs color-bit depth compression, which essentially reduces the number of colors in the image to achieve compression. In step 140, the image is input with its original color. For example, each color pixel could be represented by a standard 24-bit value. Next, in step 142, a color table is created corresponding to the image. The color table is a set of quantized color values. The quantized color values represent a smaller number of colors with correspondingly fewer bits. Each of the input pixels is mapped to the color table. In step 144, an index is calculated for each pixel in the image by dithering the pixel values. Dithering is accomplished by weighting pixels adjacent to the current pixel in a frame and then arithmetically combining the weighted values with the current pixel value to produce the index, which then represents the current pixel. The dithering process is repeated for each pixel in a frame. In step 146, the indexes are wavelet transformed. In step 148, the wavelet coefficients are entropy coded. In step 150, the coded image file is output.

Figure 11:
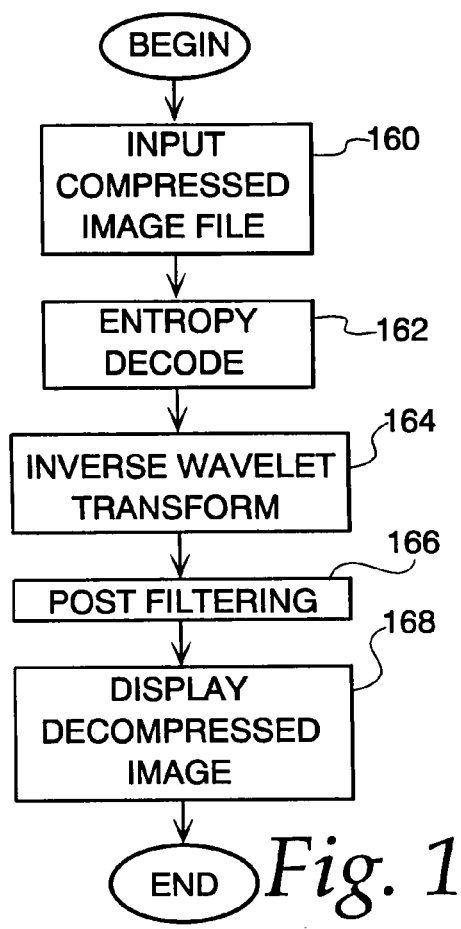
FIG. 11 illustrates a flow diagram of a method of decompressing an image that has been compressed according to the method of FIG. 10.

FIG. 11 illustrates a flow diagram of a method of decompressing an image that has been compressed according to the method shown in FIG. 10. In step 160, a compressed image file is received. Next, in step 162, the image file is entropy decoded. In step 164, an inverse wavelet transform is applied to the decoded data. Next, in step 166, post-processing filtering of the image is optionally applied. Next, in step 168, the decompressed image is displayed.

Figure 12:
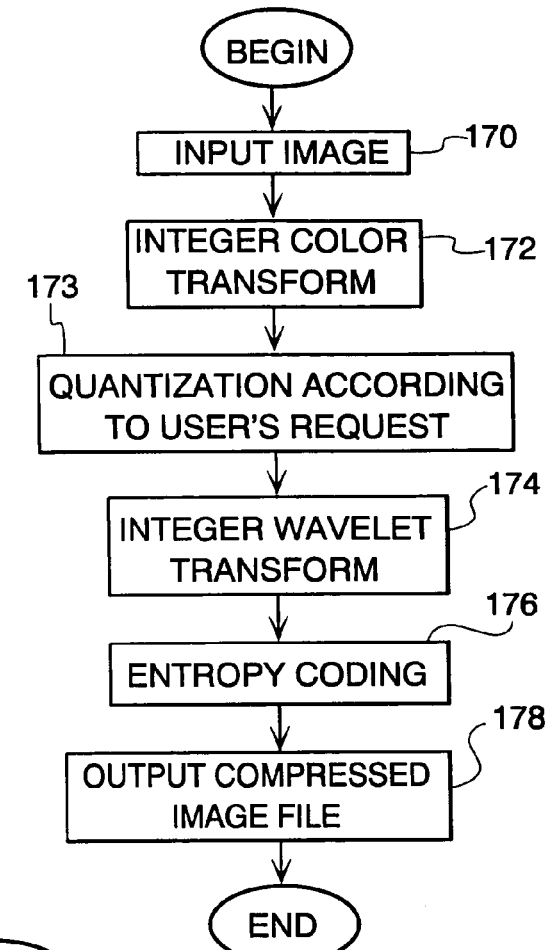
FIG. 12 illustrates a flow diagram of a method of compressing an image that is in accordance with a further embodiment of the present invention.

FIG. 12 illustrates another method of compressing an image in accordance with another embodiment of the present invention. In this method, a user can selectively vary compression parameters (step 173) to obtain a lossless or near-lossless compressed image at a desired compression ratio. In step 170, the image is input. In step 172, an integer color transform is performed on the input image. In step 173, compression parameters are selected by the user using a software interface. These parameters can include those described herein below in the subsection title "Peak Signal to Noise Ratio (PSNR) Controlled Compression". In step 174, an integer wavelet transform is performed on the color transformed pixels. In step 176, the wavelet coefficients are entropy coded. Next, in step 178, the compressed image file is then output from the system.

The integer color transformation of step 172 is an integer reversible transform which can be used in color image compression to reduce processing time and image size. Step 172 transforms RGB color components to a set of color components Y-Nb-Nr, which are known.

The RGB to Y-Nb-Nr transform is given by the equations:

$$Y = G + Int(R/2 + B/2),$$

$$Nb = B - Int(Y/2),$$

$$Nr = R - Int(Y/2).$$

The integer wavelet transform of step 174 is described below in detail.

Figure 13:
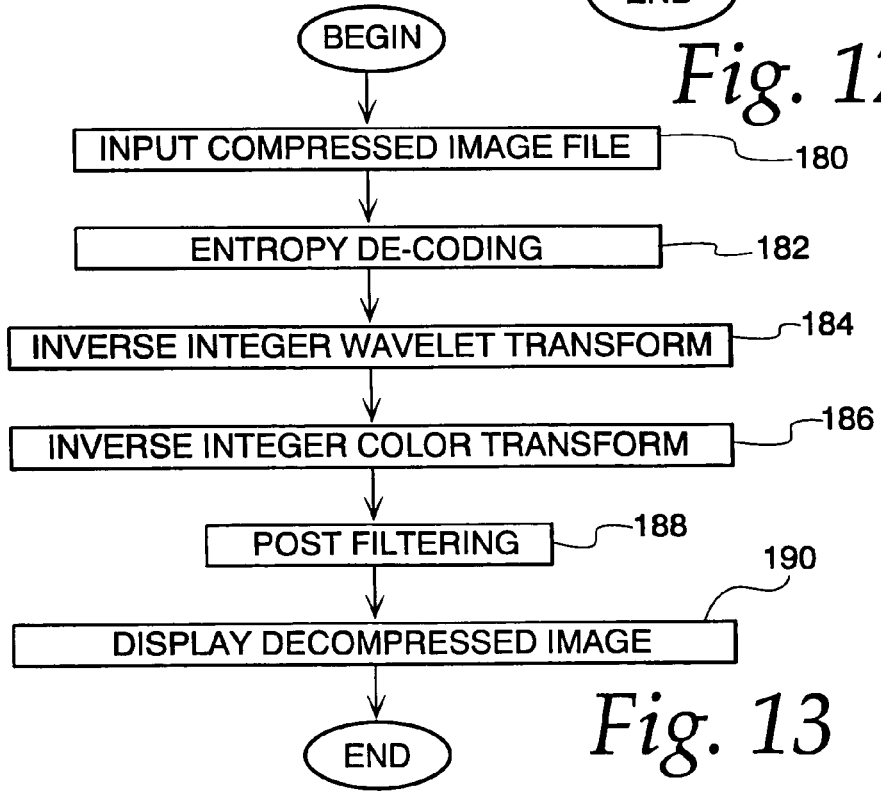
FIG. 13 illustrates a flow diagram of a method for decompressing an image that has been compressed according to the method of FIG. 12.

FIG. 13 illustrates a method of decompressing an image file that has been compressed according to the method shown in FIG. 12. In step 180, a compressed image file is input. In step 182, the image is entropy decoded. Next, in step 184, an inverse integer wavelet transform is performed on the decoded data. In step 186, an inverse integer color transform is performed. Next, in step 188 optional post-processing filtering is performed on the image. Next, in step 190, the decompressed image is displayed.

The Y-Nb-Nr to RGB transform of step 186 is given by the equations:

$$R = Nr + Int(Y/2),$$

$$B = Nb + Int(Y/2),$$

$$G = Y - Int(R/2 + B/2)$$

The inverse integer wavelet transform of step 184 is described in detail below.

Reversible Integer Wavelet Transform

This method allows a series of transformations which are very close to the corresponding biorthogonal wavelet transforms or some non-orthogonal wavelet transforms, but can be calculated with only integer addition and bit-shift operations. In addition, the integer wavelet transforms created disclosed herein possess a property of precision preservation (PPP). This property is very useful for conserving memory in both compression and decompression, and speed up the whole procedure in some applications. Two general methods from which one can get the integer wavelet transform desired are disclosed.

Basic Integer Wavelet Transformations

Two examples are provided as the starting point for the unique method. For the sake of convenience, length, and simplicity, presented is only the algorithm for a one level decomposition and reconstruction and only for a one dimensional signal. The extension to two dimensions is immediate as the rows and columns can be treated into a sequence of one dimensional signals. For the following examples, assume that $\{C_n^0\}_{n=0}^{N-1}$ is the original signal where the superscript indicates level and the subscript indicates a particular point in the signal. Also, $\{C_n^1\}_{n=0}^{N_1-1}$ and $\{d_n^1\}_{n=0}^{M_1-1}$ are its decomposition parts at the first level. Here $$N_1 = \begin{cases} \dfrac{N}{2}, & \text{if } N \text{ is an even number,} \\ \dfrac{N+1}{2}, & \text{if } N \text{ is an odd number,} \end{cases} \quad (1)$$

$$M_1 = N - N_l$$

$\{c_n^1\}_{n=0}^{N_1-1}$ and $\{d_n^1\}_{n=0}^{M_1-1}$ are its low frequency if N is an even number, if N is an odd number;

$M_1 = N - N_1$ $\{C_n^1\}_{n=0}^{N_1-1}$ and $\{d_n^1\}_{n=0}^{M_1-1}$ are its low frequency (l) part and high frequency (h) part, respectively. For multi-levels, we just create $$\{c_n^1\}_{n=0}^{N_1-1} \text{ as } \{c_n^0\}_{n=0}^{N_1}$$

and repeat the procedure again.

EXAMPLE 1

A (2,2)-Wavelet Transform by Integer Calculation

This transformation is similar to a variation of the Haar wavelet transform which uses low and high pass analysis (decomposition) filters given as:

| n | 0 | 1 |
|---|---|---|
| $\tilde{h}_n$ | ½ | ½ |
| $\tilde{g}_n$ | ½ | −½ |

(1) Compute $$d_k^1 = c_{2k}^0 - c_{2k+1}^0, \; k=0, \ldots, M_1-1 \quad (2.1)$$

(2) Compute $$c_k^l = Int\left(\dfrac{d_k^l}{2}\right) + c_{2k+1}^0, \; k = 0, \ldots, N_1 - 2, \quad (2.2)$$

$$c_{N_1-1}^l = \begin{cases} Int\left(\dfrac{d_{M_1-1}^1}{2}\right) + C_{2k+1}^0, & \text{if } N \text{ is an even number,} \\ c_{N-1}^0, & \text{if } N \text{ is an odd number.} \end{cases}$$

Here, Int(x) is an arbitrary rounding function which may have different interpretations. For example, Int(x) can be the integer which is nearest to x, or Int(x) may be any integer which satisfies x−1<Int(x)≦x, etc. It is easy to see that all entries in both $\{c_n^1\}_{n=0}^{N_1-1}$ and $\{d_n^1\}_{n=0}^{M_1-1}$ are integers.

From (2.1)–(2.2), we can easily get the following integer reconstruction algorithm:

(b) Reconstruction (1) If N is an even number, compute:

$$c_{2k+1}^0 = c_k^l - Int\left(\dfrac{d_k^l}{2}\right), \; k = 0, \ldots, N_1 - 1; \quad (2.3)$$

or, if N is an odd number, we have $$c_{2k+1}^0 = c_k^l - Int\left(\dfrac{d_k^l}{2}\right), \; k = 0, \ldots, N_1 - 2; \; c_{N-1}^0 = c_{N_1}^l. \quad (2.4)$$

(2) Compute $$c_{2k}^0 = d_k^1 + c_{2k+1}^0 \; k=0, \ldots, M_1-1. \quad (2.5)$$

REMARK. Since (2.1)–(2.5) are not linear because of the rounding operation Int(x), this means the transformation order becomes significant. For instance, if the decomposition was applied first to the columns and then to the rows, the inverse transformation must be applied first to the rows and then to the columns.

EXAMPLE 2

Lazy Wavelet Transform

The lazy wavelet transform is used to illustrate an important concept. The corresponding inverse transform is nothing else but sub-sampling the even and odd indexed samples. Decomposition and reconstruction can use the same formula as follows:

$$c_k^1 = c_{2k}^0, \; k=0, \ldots N_1-1;$$

$$d_k^1 = c_{2k+1}^0, \; k=0, \ldots, M_1-1.$$

Examples 1 and 2 are not good transforms for image compression, but they are simple. Much better transforms can be achieved from these two. As suggested above, they are considered only as a starting point for the integer, reversible, wavelet transform algorithm of the disclosed invention.

It is noted that there is another interesting property in the above two transforms which may not be easily seen. If the values of the signal pixels are represented by a finite number of bits, say one bit or one byte, the same number of bits can be used to represent the result of the forward transform within the computer itself because of the complementary code property. While, from the reconstruction algorithm, the computer will get back the exact original signal through the same complementary code property. This property is called a Property of Precision Preservation (PPP) for these wavelets.

It is known that the general values for the high frequency wavelet coefficients are small, and all higher levels of the decomposition provide generally small values in the high frequency band. This allows the preservation of precision during the computational stage of the wavelet coefficients. Now, the complementary code property, the other aspect of the PPP property, is a well know characteristic of the integer arithmetic as done by the computer. Consider the computation of the difference of two integers given as c=b−a and the inverse computation of a=b−c. the nature of the computation within the computer can be specified as follows:

$$c_m = \begin{cases} b-a & \text{if } -2^{q-1} \le b-a < 2^{q-1}-1 \\ -2^q + b - a & \text{if } b-a \ge 2^{q-1} \\ 2^q + b - a & \text{if } b-a < -2^{q-1} \end{cases}$$

and the inverse is $$a_m = \begin{cases} b-c_m & \text{if } -2^{q-1} \le b-a < 2^{q-1}-1 \\ -2^q + b - c_m & \text{if } b-c_m \ge 2^{q-1} \\ 2^q + b - c_m & \text{if } b-c_m < -2^{q-1} \end{cases}$$

where the m subscript indicates the internal representation, and the range of the integers a, b, c is $[-2^{q-1}, 2^{q-1}-1]$. The internal representation of $c_m$ when it is outside the range, its appearance is as a two's complement number, so the representation may not be the same as the external representation of c. However, the same complementary code for the $a_m$ will cause the internal representation to be identical to the external representation of a. For example, if we let b=2 (00000010) and a =−127 (10000001) then $c_m$ has the internal binary value of (10000001) when q=4. With a value of −127 for $c_m$ the inverse value for $a_m$ will just be a.

In fact, for Example 2, this property is obviously true. While for Example 1, if the range of the pixel values is within a finite number of bits, say q, we can only use q bits as the working unit, which means the value of transform coefficients will also be within the interval with length $2^q$, say $[-2^{q-1}, 2^{q-1}-1]$. Due to the nature of computation on a machine, most machines will implement (2.1)–(2.2) automatically as follows (the complementary code property):

$$d_k^1 = \begin{cases} c_{2k}^0 - c_{2k+1}^0, & \text{if } -2^{q-1} \le c_{2k}^0 - c_{2k+1}^0 < 2^{q-1}, \\ c_{2k}^0 - c_{2k+1}^0 - 2^q, & \text{if } c_{2k}^0 - c_{2k+1}^0 \ge 2^{q-1}, \\ 2^q + (c_{2k}^0 - c_{2k+1}^0), & \text{if } c_{2k}^0 - c_{2k+1}^0 < -2^{q-1}. \end{cases} \quad (2.6)$$

$$c_k^1 = \begin{cases} \text{Int}\left(\frac{d_k^1}{2}\right) + c_{2k+1}^0, & \text{if } -2^{q-1} \le \text{Int}\left(\frac{d_k^1}{2}\right) + c_{2k+1}^0 < 2^{q-1}, \\ \text{Int}\left(\frac{d_k^1}{2}\right) + c_{2k+1}^0 - 2^q, & \text{if } \text{Int}\left(\frac{d_k^1}{2}\right) + c_{2k+1}^0 \ge 2^{q-1}, \\ \text{Int}\left(\frac{d_k^1}{2}\right) + c_{2k+1}^0 + 2^q, & \text{if } \text{Int}\left(\frac{d_k^1}{2}\right) + c_{2k+1}^0 < -2^{q-1}. \end{cases} \quad (2.7)$$

While the reconstruction algorithm (2.3) and (2.5) will be implemented by the computer itself as $$c_{2k+1}^0 = \begin{cases} c_k^1 - \text{Int}\left(\frac{d_k^1}{2}\right), & \text{if } -2^{q-1} \le c_k^1 - \text{Int}\left(\frac{d_k^1}{2}\right) < 2^q, \\ 2^q + \left(c_k^1 - \text{Int}\left(\frac{d_k^1}{2}\right)\right), & \text{if } c_k^1 - \text{Int}\left(\frac{d_k^1}{2}\right) < -2^{q-1}, \\ \left(c_k^1 - \text{Int}\left(\frac{d_k^1}{2}\right)\right) - 2^q, & \text{if } c_k^1 - \text{Int}\left(\frac{d_k^1}{2}\right) > -2^{q-1}. \end{cases} \quad (2.8)$$

$$c_{2k}^0 = \begin{cases} d_k^1 + c_{2k+1}^0, & \text{if } -2^{q-1} \le d_k^1 + c_{2k+1}^0 < 2^{q-1}, \\ d_k^1 + c_{2k+1}^0 + 2^q, & \text{if } d_k^1 + c_{2k+1}^0 < -2^{q-1}, \\ d_k^1 + c_{2k+1}^0 - 2^q, & \text{if } d_k^1 + c_{2k+1}^0 \ge -2^{q-1}. \end{cases} \quad (2.9)$$

It is obvious that (2.8)–(2.9) are just the reverse of (2.6)–(2.7). It is also easy to see that if we properly take advantage of the bound in the coefficient size mentioned above, the algorithm can be implemented using a minimal amount of storage.

The following are examples which give motivation for our new approach.

EXAMPLE 3

A (2.6) Wavelet Transform by Integer Calculation (2)

This transformation is similar to using the following analysis filters:

| n | −2 | −1 | 0 | 1 | 2 | 3 |
|---|---|---|---|---|---|---|
| $\tilde{h}_n$ | 0 | 0 | ½ | ½ | 0 | 0 |
| $\tilde{g}_n$ | −1/16 | −1/16 | ½ | −½ | 1/16 | 1/16 |

(a) Decomposition

Decomposition starts with Example 1 at step (1) and (2), and then upgrades the high frequency component at step (3):

(1) Compute $d_k^{1,0} = c_{2k}^0 - c_{2k+1}^0$, $k=0, \ldots, M_1-1$.

(2) Compute $$c_k^1 = \text{Int}\left(\frac{d_k^{1,0}}{2}\right) + c_{2k+1}^0, k = 0, \ldots, N_1 - 2,$$

$$c_{N_1-1}^1 = \begin{cases} \text{Int}\left(\frac{d_{M_1-1}^{1,0}}{2}\right), + C_{N-1}^0, & \text{if } N \text{ is an even number,} \\ c_{N-1}^0, & \text{if } N \text{ is an old number,} \end{cases}$$

(3) Compute $$\begin{cases} d_0^1 = \text{Int}\left(\frac{c_0 - c_1^1}{4}\right), + d_0^{1,0} \\ d_k^1, = \text{Int}\left(\frac{c_{k-1}^1 - c_{k+1}^1}{4}\right) - d_k^{1,0}, k = 1, \ldots, M_1 - 2, \end{cases}$$

and then, if N is even, calculate $$d_{M_1-1}^1 = \text{Int}\left(\frac{c_{N_1-2}^1 - c_{N_1-1}^1}{4}\right) - d_{M_1-1}^{1,0},$$

else, calculate $$d_{M_1-1}^1 = \text{Int}\left(\frac{c_{N_1-3}^1 - c_{N_1-1}^1}{4}\right) - d_{M_1-1}^{1,0}.$$

(b) Reconstruction

The reconstruction algorithm is identical to the decomposition algorithm, except it is now running "backwards".

(1) Compute $$\begin{cases} d_0^{1,0} = \text{Int}\left(\frac{c_0^1 - c_1^1}{4}\right) - d_0^1 \\ d_k^{1,0} = \text{Int}\left(\frac{c_{k-1}^1 - c_{k+1}^1}{4}\right) - d_k^1, k = 1, \ldots, M_1 - 2, \end{cases}$$

and then, if N is even, calculate $$d_{M_1-1}^{1,0} = \text{Int}\left(\frac{c_{N_1-2}^1 - c_{N_1-1}^1}{4}\right) - d_{M_1-1}^{1,1},$$

else calculate $$d_{M_1-1}^{1,0} = \text{Int}\left(\frac{c_{N_1-3}^1 - c_{N_1-1}^1}{4}\right) - d_{M_1-1}^{1,1},$$

(2) If N is an even number, compute $$c_{2k+1}^0 = c_k^1 - \text{Int}\left(\frac{d_k^{1,0}}{2}\right), k = 0, \ldots, N_1 - 1;$$

or, if N is an odd number, we have $$c_{2k+1}^0 = c_k^1 - \text{Int}\left(\frac{d_k^{1,0}}{2}\right), k = 0, \ldots, N_1 - 2;$$

$$c_{N-1}^0 = c_{N_1}^1.$$

(3) Compute $$c_{2k}^0 = d_k^{1,0} + c_{2k+1}^0, k = 0, \ldots, M_1 - 1.$$

We see in step (2)–(3) above, that they are just the same as shown for the reconstruction of the (2,2)-wavelet transform (Example 1).

EXAMPLE 4

A (1,3)-Wavelet Transform by Integer Calculation

The following nonlinear transform is a variation of the transform which uses biorthogonal analysis filters:

| n | −1 | 0 | 1 |
|---|----|---|---|
| $\tilde{h}_n$ | 1 | 0 | 0 |
| $\tilde{g}_n$ | 1/4 | −1/2 | 1/4 |

(a) Decomposition

This decomposition starts with the Lazy wavelet at step (1) and upgrades the high frequency component at step (2):

(1) Set $$c_k^1 = c_{2k}^0, k = 0, \ldots, N_1 - 1;$$

$$d_k^1 = c_{2k+1}^0, k = 0, \ldots, M_1 - 1;$$

(2) If N is an even number, calculate $$\begin{cases} d_k^1 = \text{Int}\left(\frac{c_k^1 - c_{k+1}^1}{2}\right) - d_k^{1,0}, k = 0, \ldots, M_1 - 2, \\ d_{M_1-1}^1, = c_{N_1-1}^1 - d_{M_1-1}^{1,0}. \end{cases}$$

Otherwise, if N is an odd number, calculate $$d_k^1 = \text{Int}\left(\frac{c_{2k}^0 + c_{2k+2}^0}{2}\right) - c_{2k+1}^0, k = 0, \ldots, M_1 - 1.$$

(b) Reconstruction
(1) Set $c_{2k}^0 = c_k^1, k=0, \ldots, N_1-1;$ (2) If N is an even number, calculate $$\begin{cases} c_{2k+1}^0 = \text{Int}\left(\dfrac{c_{2k}^0 + c_{2k+2}^0}{2}\right) - d_k^1, k = 0, \ldots, M_1 - 2, \\ c_{N-1}^0, = c_{N-2}^0 - d_{M_1-1}^1. \end{cases}$$

Otherwise, if N is an odd number, calculate $$c_{2k+1}^0 = \text{Int}\left(\dfrac{c_{2k}^0 + c_{2k+2}^0}{2}\right) - d_k^1, k = 0, \ldots, M_1 - 1.$$

EXAMPLE 5

(5,3)-Wavelet Transform by Integer Calculation

This transformation is also similar in function to using the biorthogonal analysis filters. It is given by

| n | -2 | -1 | 0 | 1 | 2 |
|---|---|---|---|---|---|
| $\tilde{h}_n$ | -1/8 | 1/4 | 3/4 | 1/4 | -1/8 |
| $\tilde{g}_n$ | 1/4 | -1/2 | 1/4 | 0 | 0 |

(a) Decomposition
This decomposition starts with Example 3 at step (1) and upgrade low frequency components at step (2):
(1) Set $c_k^{1,0} = c_{2k}^0, k=0, \ldots, N_1-1;$ If N is an even number, calculate $$\begin{cases} d_k^1 = \text{Int}\left(\dfrac{c_{2k}^0 + c_{2k+2}^0}{2}\right) - c_{2k+1}^0, k = 0, \ldots, M_1 - 2, \\ d_{M_1-1}^1 = c_{N-2}^0 - c_{N-1}^0. \end{cases}$$

Otherwise, if N is an odd number, calculate $$d_k^1 = \text{Int}\left(\dfrac{c_{2k}^0 + c_{2k+2}^0}{2}\right) - c_{2k+1}^0, k = 0, \ldots, M_1 - 1.$$

(2) If N is an even number, compute $$\begin{cases} c_0^1 = c_0^{1,0} - \text{Int}\left(\dfrac{d_0^1}{2}\right), \\ c_k^1 = c_k^{1,0} - \text{Int}\left(\dfrac{d_{k-1}^1 + d_k^1}{4}\right), k = 1, \ldots, N_1 - 2, \\ c_{N_1-1}^1 = c_{N_1-2}^{1,0} - \text{Int}\left(\dfrac{d_{N_1-2}^1 + d_{N_1-1}^1}{4}\right). \end{cases}$$

Otherwise, if N is an odd number, calculate $$\begin{cases} c_0^1 = c_0^{1,0} - \text{Int}\left(\dfrac{d_0^1}{2}\right), \\ c_k^1 = c_k^{1,0} - \dfrac{d_{k-1}^1 + d_k^1}{4}, k = 1, \ldots, N_1 - 2, \\ c_{N_1-1}^1 = c_{N_1-1}^{1,0} - \text{Int}\left(\dfrac{d_{M_1-1}^1}{2}\right). \end{cases}$$

(b) Reconstruction
(1) Compute $$c_0^0 = c_0^1 + \text{Int}\left(\dfrac{d_0^1}{2}\right), c_{2k}^0 = c_k^1 + \text{Int}\left(\dfrac{d_{k-1}^1 + d_k^1}{4}\right), k = 1, \ldots, N_1 - 2,$$

Then, if N is even, calculate $$c_{N-2}^0 = c_{N_1-1}^1 + \text{Int}\left(\dfrac{d_{N_1-2}^1 + d_{N_1-1}^1}{4}\right).$$

else calculate $$c_{N-1}^0 = c_{N_1-1}^1 + \text{Int}\left(\dfrac{d_{M_1-1}^1}{2}\right).$$

(2) Compute $$c_{2k+1}^0 = \text{Int}\left(\dfrac{c_{2k}^0 + c_{2k+2}^0}{2}\right) - d_k^1, k = 0, \ldots, M_1 - 2,$$

Then, if N is even, calculate $c_{N-1}^0 = c_{N-2}^0 - d_{M_1-1}^1.$

The PPP property for Examples 1–2 mentioned at the end of the previous section is also applicable for these three examples. It is obvious these three transformations are not really linear, but they are similar to the one using the corresponding filters given above. Especially, the filters in Example 3 and Example 5 belong to, with minor modification, the group of the best biorthogonal filters for image compression.

Also, from the above three examples, we can note that if we begin with integer (linear or nonlinear) wavelet transformations and then use some proper upgrading formulas, we can get other, much better integer, wavelet transformations for image compression.

Lifting Scheme and Integer Biorthogonal Filtering

The Lifting scheme, discussed by W. Sweldens in "The Lifting Scheme: A Custom-Designed Construction of Biorthogonal Wavelet", Applied and Computational Harmonic Analysis, Vol. 3, No. 2, April 1996, is a recently developed approach for constructing biorthogonal wavelets with compact support. It can be used, with minor modifications, to create integer biorthogonal wavelet transformations. The following is an adaptation of the lifting scheme.

Definition 1. The set of filters {h, h̃, g, g̃}, a set of biorthogonal filters if the following formula is satisfied:

$$\forall \omega \in \mathbb{R} : \tilde{m}(\omega) M'(\omega) = 1.$$

$$m(\omega) = \begin{bmatrix} h(\omega) & h(\omega + \pi) \\ g(\omega) & g(\omega + \pi) \end{bmatrix},$$

$$h(\omega) = \sum_k h_k e^{-k\omega} \text{ and } g(\omega) = \sum_k g_k e^{-k\omega},$$

where and and similarly for $\tilde{m}(\omega)$, $\tilde{h}(\omega)$ and $\tilde{g}(\omega)$.

The following lemma is the main result of the lifting scheme [1] reported as corollary 6 in that paper.

Lemma 1. Take an initial set of finite biorthogonal filters {h, h̃°, g°, g̃}, then a new set of finite biorthogonal filters {h, h̃, g, g̃} can be found as $$\tilde{h}(\omega) = \tilde{h}^0(\omega) + \tilde{g}(\omega) \overline{s(2\omega)}$$

$$g(\omega) = g^0(\omega) - h(\omega) s(2\omega).$$

Similarly, if we take {h°, h̃, g, g̃°} as an initial set of biorthogonal filters, a new set of biorthogonal filters {h, h̃, g, g̃} can be found as $$h(\omega) = h^0(\omega) + g(\omega) \overline{\tilde{m}\tilde{l}; \tilde{e}\tilde{p}\tilde{m}\tilde{l}\tilde{o}\tilde{b}\tilde{s}\tilde{o}\tilde{b}\tilde{x}\tilde{m}\tilde{x}(2\omega)}$$

$$\tilde{g}(\omega) = \tilde{g}^0(\omega) - \tilde{h}(\omega) \tilde{s}(2\omega).$$

Here $s(\omega)$ is a trigonometric polynomial and the corresponding filter s is finite, and so is $\tilde{s}(\omega)$. Actually, regarding the filters (4.1) is equivalent to $$\tilde{h}_k = \tilde{h}_k^0 + \sum_l \tilde{g}_{k+2l} \tilde{s}_l$$

$$g_k = g_k^0 - \sum_l h_{k-2l} \tilde{s}_l$$

or $$h_k = h_k^0 + \sum_i g_{k+2i} \tilde{s}_l \quad (4.26)$$

$$\tilde{g}_k = \tilde{g}_k^0 - \sum_i \tilde{h}_{k-2i} s_1$$

Next we use the lifting scheme with minor modifications to create an integer, nonlinear, quasi-biorthogonal, wavelet algorithm. Suppose $[C_n^0]$ is a original signal, $[C_n^1]$ and $[d_n^1]$ are again its low and high frequency decomposition parts, obtained by using the filters {h, h̃, g, g̃}.

If we use filters {h̃, g̃} for decomposition (analysis), the corresponding decomposition algorithm is $$\begin{cases} c_k^1 = \alpha_c \sum_n c_n^0 \tilde{h}_{n-2k}, \\ d_k^1 = \alpha_d \sum_n C_n^0 \tilde{g}_{n-2k}. \end{cases}$$

While the reconstruction algorithm will be $$c_n^0 = 2 \sum_k \left( \frac{c_k^1 h_{n-2k}}{\alpha_c} + \frac{d_k^1 g_{n-2k}}{\alpha_d} \right),$$

related to the synthesis filter {h, g}. Here, parameters $\alpha_c$ and $\alpha_d$ are positive constants with $\alpha_c \cdot \alpha_d = 2$. For example, in the situation of regular biorthogonal decomposition and reconstruction, $\alpha_c = \alpha_d = \sqrt{2}$; and for Example 1 through Example 5 above, $\alpha_c = 1$ and $\alpha_d = 2$.

If the set of filters {h, h̃, g, g̃} is from {h, h̃°, g°, g̃} by (4.2b), then decomposition can be accomplished as follows:

1. Calculate $$\begin{cases} c_k^{1,0} = \alpha_c \sum_n c_n^0 \tilde{h}_{n-2k}^0, \\ d_k^1 = \alpha_d \sum_n c_n^0 \tilde{g}_{n-2k}. \end{cases}$$

2. Calculate $$c_k^1 = c_k^{1,0} + \frac{\alpha_c}{\alpha_d} \sum_l d_{k-1}^1 s_1. \quad (4.4)$$

The relative reconstruction scheme will be:

1. Calculate $$c_k^{1,0} = c_k^1 \frac{\alpha_c}{\alpha_d} \sum_l d_{k-1}^1 s_1 \quad (4.5)$$

2. Calculate $$c_n^0 = 2 \sum_k \left( \frac{c_k^{1,0} h_{n-2k}}{\alpha_c} + \frac{d_k^1 g_{n-2k}^0}{\alpha_d} \right). \quad (4.6)$$

Here, equations (4.3) and (4.6) are just the wavelet (inverse) transforms using biorthogonal filters {h, h̃°, g°, g̃}. While (4.4) and (4.5) are forward and backward upgrading formulas.

Similarly if the set of filters {h, h̃, g, g̃} is from the initial set of filters {h°, h̃, g, g̃°} by using (4.2b), the relative decomposition is:

1. Calculate $$\begin{cases} c_k^1 = \alpha_c \sum_n c_n^0 h_{n-2k} \\ d_k^{1,0} = \alpha_d \sum_n c_n^0 \tilde{g}_{n-2k}^0 \end{cases}$$

2. Calculate $$d_k^1 = d_k^{1,0} \frac{\alpha_c}{\alpha_d} \sum_1 c_{k-1}^1 s_1$$

The reconstruction scheme is:
1. Calculate
1. Calculate $$d_k^{1,0} = d_k^1 \frac{\alpha_c}{\alpha_d} \sum_1 c_{k-1}^1 s_1$$

2. Calculate $$c_n^0 = 2 \sum_k \left( \frac{c_k^{1,0} h_{n-2k}}{\alpha_c} + \frac{d_k^1 g_{n-2k}^0}{\alpha_d} \right).$$

Corollary 4.1. Suppose biorthoganal filters $\{h, \tilde{h}, g, \tilde{g}\}$ are from initial filters $\{h, \tilde{h}^o, g^o, \tilde{g}\}$ by the lifting scheme (4.1a) or (4.2a). If the decomposition and reconstruction by filters $\{h, \tilde{h}^o, g^o, \tilde{g}\}$ can be accomplished only by integer calculation, such as Example 2, we also can create a corresponding integer wavelet decomposition and reconstruction scheme which is very "close" to the original one by using filters $\{h, \tilde{h}, g, \tilde{g}\}$. Here the word "close" means that the difference of the two decompostion schemes is just some rounding error, and this rounding error will be corrected by the integer reconstruction scheme.

In fact, if $\{c_k^{1,0}\}$ and $\{d_k^1\}$ are integer after (4.3), we can calculate $\{c_k^1\}$ by $$c_k^1 = c_k^{1,0} + Int\left( \frac{\alpha_c}{\alpha_d} \sum d_{k-1} s_1 \right)$$

instead of (4.4). Here Int(x), as described in Section 2, is an arbitrary rounding up function which satisfies $x-1 \leq Int(x) \leq x+1$. It is obvious that (4.7) is very close to (4.4), and the exact reconstruction scheme can easily be obtained from $$c_k^{1,0} = c_k^1 - Int\left( \frac{\alpha_c}{\alpha_d} \sum_1 d_{k-1}^1 s_1 \right)$$

and (4.6). There will be a similar result, if the set of biorthogonal filters $\{h, \tilde{h}, g, \tilde{g}\}$ is obtained from the initial set of filters $\{h^o, \tilde{h}, g, \tilde{g}^o\}$ by using (4.2b).

Except for the example shown in the Lazy wavelet (Example 2), most standard biorthogonal wavelet forms cannot be performed directly by integer, even for one of the simplest wavelets, the Harr wavelet. However, if the parameters $\alpha_c$, and $\alpha_d$ are properly chosen and the transform algorithms, such as Example 1 and Example 3, are slightly changed, a variation of the original biorthogonal wavelet transforms with respect to the set of filters $\{h, \tilde{h}, g, \tilde{g}\}$ is created. On the other hand, the parameters should be also chosen carefully to guarantee that only addition and shift operations are needed by the algorithm.

If the set of filters $\{h, \tilde{h}, g, \tilde{g}\}$ is obtained from a set of filters $\{h^o, \tilde{h}, g, \tilde{g}^o\}$ by the lifting scheme, and the set $\{h^o, \tilde{h}, g, \tilde{g}^o\}$ is also obtained from a filter set $\{h^o, \tilde{h}^o, g^o, \tilde{g}^o\}$, one can repeatedly use Corollary 1 to get a "close" integer wavelet transformation.

The Correction Method for Creating Integer Wavelet Transforms

Another approach for obtaining integer wavelets is using the so-called Correction method. The motivation of this method is from the S+P transform. The lifting scheme for generating biorthogonal wavelets can be considered as a special case of the correction method. From this can be derived complicated filters with fast decomposition and reconstruction algorithms.

Assuming a simple integer wavelet transform, such as Examples 1 through 3, the decomposition and reconstruction scheme of which can be formulated as follows:

Decomposition $$c_1^{1,0} = df_c(\{c_n^o\})$$

$$d_1^{1,0} = df_d(\{c_n^o\}) \tag{5.1}$$

Reconstruction $$c_n^0 = rf(\{c_1^{1,0}\}, \{d_k^{1,0}\}) \tag{5.2}$$

Here, (5.1) and (5.2) can be the same as (4.3) and (4.6) or other algorithms.

In general, after the above decomposition, one may not be satisfied with the result. There may still be some correlation among the high pass components because of the aliasing from the low pass components, or the low pass components do not carry enough of the expected information from the original signal. Hence, one could make an improvement by putting some correction part on the high pass components or low pass components. There are many ways to accomplish this. However, for the sake of the integer calculation, it is preferable to use following correction method. To make a correction for the high pass part, the corresponding formula would be:

$$d_2^1 = d_k^{1,0} - Int(dc_{2,k}^1) k = \ldots, 0, 1, 2 \ldots \tag{5.3}$$

Here, $dc_k^1$ is a correction quantity for $d_k^1$ $$d_k^1 = \sum_{j=1}^{s_1} \sigma_i c_{k+1}^{1,0} + \sum_{j=1}^{1} \tau_j d_{k+j}^{1,0}, k = \ldots, 0, 1, 2, \ldots \tag{5.4}$$

and $\{\sigma_i\}_{j=s_o}^{S_R}$ and $\{\tau_j\}_{j2}^T$, are given parameters which have been chosen for the user's purpose such as reducing the redundancy among high pass components or some other special requirement. To preserve the integer calculation, any entries in both $\{\sigma_i\}_{i=s_o}^{S_l}$ and $\{\tau_j\}_{j=1}^T$ should be rational numbers with denominators being powers of 2.

From (5.1), (5.3) and (5.4), it is easy to see the perfect reconstruction algorithm can be $$d_k^{1,0} = d_k^1 + Int(dc_k), \ k = \ldots, m, m-1, m-2 \ldots, \quad (5.5)$$

combined with (5.2).

As mentioned above, the Lifting scheme is a special condition of the correction method. Examples 3 through 5 can also be considered as the examples of this method. We next give an example of the Correction method which cannot be included in the group of Lifting scheme, and also which does not result in a closed form of compact support for biorthogonal filters.

EXAMPLE 6

S+P Transform, which is Similar to Using Following Analysis Filters

| n | −2 | −1 | 0 | 1 | 2 | 3 |
|---|---|---|---|---|---|---|
| $\tilde{h}_n$ | 0 | 0 | ½ | ½ | 0 | 0 |
| $\tilde{g}_n$ | −1/16 | −1/16 | 15/32 | −17/32 | 7/32 | −1/32 |

While the synthesis filters do not have compact support, the S+P transform can be implemented as follows:

(a) Decomposition (1) Take the decomposition step of Example 1, that is, compute $$d_k^{1,0} = c_{2k}^0 - c_{2k+1}^0, \ k = -0, 1, \ldots, M_1-1;$$

and $$c_k^1 = Int\left(\frac{d_k^{1,0}}{2}\right) + c_{2k+1}^0, \ k = 0, \ldots, N_1 - 2,$$

$$c_{n_1-1}^1 = \left\{ Int\left(\frac{d_{M_1-1}^{1,0}}{2}\right) + c_{N-1}^0, c_{n-1}^0 \right.$$

(2) Correction Step: Define $S_0 = -1$, $S_1 = 1$, $T=1$ and $$\sigma_{-1} = -\frac{1}{4}, \ \sigma_0 = -\frac{1}{6}, \ \sigma_1 = \frac{1}{6}; \ \tau_1 = \frac{1}{4}.$$

and now compute $$d_0^1 = d_0^{1,0} - Int\left(\frac{c_0^1 - c_1^1}{4}\right);$$

$$d_k^1 = d_k^{1,0} - Int\left(\frac{2c_{k-1}^1 + c_k^1 - 3c_{k+1}^1 - 2d_{k+1}^{1,0}}{8}\right), \ k = 1, \ldots, M_1 - 2;$$

$$d_{M_1-1}^1 = d_{M_1-1}^{1,0} - Int\left(\frac{C_{M_1-2}^1 - C_{M_1-1}^1}{4}\right).$$

(b) Reconstruction (1) Compute $$d_{M_1-1}^{1,0} = d_{M_1-1}^1 + Int\left(\frac{C_{M_1-2}^1 - C_{M_1-1}^1}{4}\right)$$

$$d_k^{1,0} = d_k^1 + Int\left(\frac{2c_{k-1}^1 + c_k^1 - c_{k+1}^1 - 2d_{k+1}^{1,0}}{8}\right), \ k = M_1 - 2, \ldots, 1;$$

$$d_0^{1,0} = d_0^1 + Int\left(\frac{c_0^1 - c_1^1}{4}\right).$$

(2) If N is an even number, compute $$c_{2K+1}^0 = c_k^1 - Int\left(\frac{d_k^1}{2}\right), \ k = 0, \ldots, N_1 - 1$$

or, if N is an odd number, we have $$c_{2k+1}^0 = c_k^1 - Int\left(\frac{d_k^1}{2}\right), \ k = 0, \ldots, N_1 - 2,$$

$$c_{N-1}^0 = c_{N_1}^1.$$

(3) Compute $$c_{2k}^0 = d_k^1 + c_{2k+1}^0, \ k = 0, \ldots M_1 - 1.$$

Boundary Conditions

There are two issues dealing with boundary filtering if the Lifting scheme or the Correction method is used to generate the integer wavelet transformations. The first is how to process the boundaries which occur in the start-up wavelet transformations. The second is how to deal with the boundaries in the deductive formula. If the boundaries in the start-up wavelet transform have already been established, then those in the upgrading formula are relatively easy to establish. For the Lifting scheme, the boundaries in both steps should be processed in the same way. While, for the Correction method, according to (5.3)–(5.4), one has more choices to process boundaries in the second step. Therefore, the process by which the boundaries in the start-up wavelet transformations are established is discussed. Assume compact supported biorthogonal wavelets.

Suppose the original signal is $\{C_n^o\}_{n=o}^N$. For creating integer biorthogonal wavelet transformations, use the following symmetric extension:

(1) If current biorthogonal filters have even length, the boundaries of the signal are extended as $C_{-k}^o = C_{k-1}^o$, $k=1, 2, \ldots$;

(2) If the filters have odd length, the following extension is performed $$C_{-k}^o = C_k^o, \ k=1, 2, \ldots.$$

Examples 1 through 5 use the boundaries given above. In Example 6, the start up wavelet transform uses the above boundaries but in the upgrading step, another boundary filtering is used. In addition, for arbitrarily sized images or signals, one can use the same technique described in the above examples to deal with this condition.

As mentioned earlier, for many applications, lossless image compression is more important than lossy compression. The integer wavelet transforms described above provide the opportunity to compress without loss. It is also obvious that the integer wavelet algorithms can be used wherever ordinary wavelets are used, especially in signal and image compression. However, for most computers, the integer wavelet transform is much faster than other wavelets and it uses much less memory.

Peak Signal to Noise Ratio (PSNR) Controlled Compression

Peak Signal to Noise Ratio (PSNR) is a widely used quality measurement. PSNR controlled compression allows users to choose their desired PSNR for the compressed image. In each of the compression methods set forth herein, a user can selectively set the PSNR and the desired compression ratio, as well as the initial quantization and threshold levels for each quadrant of wavelet coefficients, to obtain the desired image quality.

For example, the wavelet map of FIG. 3 shows a total of 10 regions (quadrants). Each of these ten quadrants can have two additional parameters associated with them. The parameters define the quantization and threshold values for that particular quadrant. Since there are three planes for color (only one for gray level) the maximum number of parameters that the user can control is 60—10 for quantization and 10 for thresholding for each of the three color layers. In the case of a gray level image, there are only 20 parameters.

If a compression ratio, or a quality factor which indirectly defines a compression ratio, is specified, then the user wants the compression ratio to remain identical over the changes in the parameters. In order to accomplish this, two parameters are monitored: the compression ratio and PSNR (peak signal to noise ratio). The PSNR is defined as PSNR=20 $\log_{10}$ (X/MSE), where the X is the average absolute value of the pixels in the compressed image and MSE is the mean squared error measured between the compressed and original image. Holding the compression ratio constant, the PSNR needs to increase to improve image quality. The way to increase the PSNR is to reduce the MSE.

An iterative method can be used to adjust parameters to achieve the desired PSNR. The step are as follows:
(a) Pick an initial parameter setting $P_0$;
(b) Quantize the wavelet coefficients with $P_0$ and calculate the corresponding PSNR;
(c) If the PSNR is close to the desired one, stop and output the coded file; otherwise, get an adjusted vector $\Delta P_0$ and set $P_0 \leftarrow P_0 + \Delta P_0$, go to step (b).

Progressive Decomposition

Progressive decompression allows users to decode images at varying degrees of resolution, starting from the lowest resolution and progressing to the highest resolution. The advantage of this feature is that users can download small pieces of the coded file and view the image at lower resolution to determine if they want to download the whole image. Progressive decomposition can be used with any of the decompression methods previously disclosed herein. Progressive decomposition is accomplished according to the following steps:
(a) Input the lowest bandpass component $C^1$ of the coded file and reconstruct the lowest resolution image $I^0$;
(b) Display image $I^0$;
(c) If the user is not satisfied with the image quality or the resolution is big enough for stop; otherwise, go to step (d);
(d) Input the lowest three band-pass components $HD^1$, $VD^1$, and $DD^1$ successively in the current image file. Reconstruct the new image $I^1$ from $C^1$, $HD^1$, $VD^1$, and $DD^1$. Let $I^0=I^1$; go to step (b).

Image Map Editor

The image map editor creates an image map over a compressed image file. This permits an image compressed according to one of the methods set forth herein to be easily integrated into a web page using an http link. A user selects one or several areas of compressed image, assigns one or more http links to the areas. The image map editor calculates the coordinates of the areas and outputs the HTML associate with the image. The user can add such information into program source code. Following is an example of such image map:

<EMBED SRC="cow.cod"type="image/cis-cod"
WIDTH="257" poly="44, 45, 103, 78, 103, 86, 54, 86, 54, 78",
href="[user assigned http link]"></EMBED>

Non-Uniform Image Compression

The present invention allows a user to perform non-uniform image compression. Essentially, non-uniform compression is accomplished by dividing an image into one or more rectangles, each representing a matrix of image pixels. Each rectangle can be compressed by any of the methods disclosed herein.

For instance, referring to the compression method of FIG. 8, integrating the non-uniform compression feature with the method allows a user to partition the image into several parts with different interests. The user can then compress these areas with different image and/or compression qualities. The parts can have any shape.

The non-uniform compression feature can be incorporated in to the method of FIG. 8 as follows. Steps 100–102 are performed. Then, the user creates bitmap matrices defining the partitioned areas. Each area is then wavelet transformed. Different quantizations are then applied to the different areas according to the transformed matrices obtained above.

Split and Merge Wavelet Algorithm for Big Image Compression

This algorithm allows users to compress large images by partitioning them into smaller pieces. The key is to divide the original image into several smaller pieces and compress/decompress them separately by using overlap and de-overlap technique. With this technique, the individually compressed pieces are equivalent to compressed whole image. The user does not see any edge effects in the decompressed image, which normally occur with conventional split and merge methods.

Also, with this algorithm, users can selectively decompress the whole image or choose a specific part to decompress according to an image map created during the compression phase. The algorithm is preferably implemented as a software program executing on a general purpose computer.

There are two ways to compress an image by splitting it: automatically or interactively. The automatic approach is transparent to users since the algorithm will automatically split to the image according to the characteristics of the computer used to perform the compression. Using the automated method, the algorithm first detects the size of the source image and the memory size of the host computer. Next, the image is split into several pieces with a predetermined number of pixels overlapping according to the image size and computer's memory. Overlapping pixels are those that appear in more than one piece of the split image.

Each piece of image is compressed in order according to any of the methods disclosed herein from the image resource.

The split image is decompressed as follows. First, the headers of the compressed image pieces are read to determine their order and compression parameters, such as quantization thresholds and decomposition levels. Next, each piece of the image is decompressed and de-overlapped. Merge all pieces together in the proper place for display.

Using the interactive method, a user can indicate how many blocks they want to divide the image into and how many pixels they want for overlap. To compress an image according to this approach, the size of the source image is first detected. Then, the user's choice for the number of blocks and number of overlapping pixels is entered. Next, the image is divided into the pieces according to the user's choice and the size of the image. Finally, the individual pieces are compressed according to one of the methods disclosed herein.

The interactively split image is decompressed as follows. First, the header of the coded image is read. Next, an image map is displayed for the user to look at what the image context is about. The user can then choose to display entire image or a specific piece of image. If user chooses to display a single piece of image, the algorithm finds the position of this coded piece and decompresses it. If the user instead chooses to display the entire image, the algorithm decompress each piece of image and de-overlaps it. All pieces are then merged together in the appropriate display location.

Example A, below, shows further technical details related to the present invention.

Attached in Appendix A is a listing of a computer that is related to the present invention.

While specific embodiments of the present invention have been shown and described, it will be apparent to this skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. An image compression system, comprising:
an image source providing an image, the image having a plurality of pixels, each of the pixels having a finite number of bits;
a compressor coupled to the image source, the compressor configured to generate a compressed image based on an integer wavelet transform derived using a technique selected from a lifting scheme and a correction method, wherein the integer wavelet transform used modular arithmetic and wavelet coefficients of the integer wavelet transform have a finite number of bits that are no greater in number than the highest count for the number of bits for any of the pixels of the image.

2. The image compression of claim 1, wherein the compressor quantizes a wavelet transformed image to produce the compressed image.

3. The image compression system of claim 1, wherein the compressor entropy encodes a quantized image to produce the compressed image.

4. The compression system of claim 1, wherein the compressor performs a color transformation to produce the compressed image.

5. An image decompression system, comprising:
a compressed image source providing a compressed image;
a decompressor coupled to the compressed image source, the decompressor configured to generate a decompressed image based on an integer wavelet transform derived using a technique selected from a lifting scheme and a correction method, wherein the integer wavelet transform used modular arithmetic and wavelet coefficients of the integer wavelet transform have a finite number of bits that are no greater in number than a finite number of bits for any of the pixels of the decompressed image.

6. A computer-readable memory storing a computer program for directing a computer system to perform image compression, wherein the computer program implements the steps for performing integer wavelet transformation of an input image having a finite number of bits per pixel, quantizing the wavelet transformed image, applying entropy coding to the quantized image, and outputting a file that includes the entropy coded image, wherein the integer wavelet transform used modular arithmetic and wavelet coefficients of the wavelet transformed image have no more finite number of bits than do any of the pixels of the input image.

* * * * *